(12) United States Patent
Kamiya et al.

(10) Patent No.: US 12,498,891 B2
(45) Date of Patent: Dec. 16, 2025

(54) RECORDING SYSTEM AND NON-TRANSITORY COMPUTER-READABLE MEDIUM

(71) Applicant: BROTHER KOGYO KABUSHIKI KAISHA, Nagoya (JP)

(72) Inventors: Nobuyuki Kamiya, Anjo (JP); Hirotaka Kubota, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 201 days.

(21) Appl. No.: 18/476,311

(22) Filed: Sep. 28, 2023

(65) Prior Publication Data

US 2024/0020064 A1  Jan. 18, 2024

Related U.S. Application Data

(63) Continuation of application No. PCT/JP2021/033667, filed on Sep. 14, 2021.

(30) Foreign Application Priority Data

Mar. 31, 2021 (JP) ................. 2021-060512

(51) Int. Cl.
*G06F 3/12* (2006.01)
*G06Q 20/14* (2012.01)
(Continued)

(52) U.S. Cl.
CPC .......... *G06F 3/1204* (2013.01); *G06F 3/1239* (2013.01); *G06F 3/1255* (2013.01);
(Continued)

(58) Field of Classification Search
None
See application file for complete search history.

(56) References Cited

U.S. PATENT DOCUMENTS

2004/0184055 A1  9/2004 Agehama et al.
2009/0171801 A1  7/2009 Ryo
(Continued)

FOREIGN PATENT DOCUMENTS

JP  2002-137501 A  5/2002
JP  2003-223523 A  8/2003
(Continued)

OTHER PUBLICATIONS

International Search Report for PCT/JP2021/033667 dated Nov. 22, 2021.
(Continued)

*Primary Examiner* — Darryl V Dottin
(74) *Attorney, Agent, or Firm* — KENEALY VAIDYA LLP

(57) ABSTRACT

A recording system includes: an information processing device including an input interface and a display unit; and a recording device including a recording unit that executes a recording operation on a recording medium, the recording device being configured to control the recording unit to execute the recording operation within a range of a recording permission amount for permitting the recording operation by the recording unit, wherein the recording system is configured to execute a tutorial process such that, in the tutorial process, a tutorial operation screen for notifying a guidance to a user about a charge operation is displayed on the display unit, the charge operation being an operation on the input interface for purchasing the recording permission amount.

15 Claims, 8 Drawing Sheets

(51) Int. Cl.
    *G07F 17/26*    (2006.01)
    *H04N 1/34*    (2006.01)
(52) U.S. Cl.
    CPC ......... *G06Q 20/145* (2013.01); *G06F 3/1292* (2013.01); *G07F 17/266* (2013.01); *H04N 1/346* (2013.01)

(56) References Cited

U.S. PATENT DOCUMENTS

2015/0120466 A1* 4/2015 Redlich .............. G06Q 30/0273
                                                    705/14.69
2019/0364158 A1* 11/2019 Curry ................. G06Q 20/3276
2022/0137891 A1    5/2022 Kawaguchi et al.

FOREIGN PATENT DOCUMENTS

| JP | 2004-287661 A | 10/2004 |
| JP | 2007-293762 A | 11/2007 |
| JP | 2008-40746 A | 2/2008 |
| JP | 2009-157563 A | 7/2009 |
| JP | 2015-16594 A | 1/2015 |
| JP | 2021-18621 A | 2/2021 |

OTHER PUBLICATIONS

International Preliminary Report On Patentability and Written Opinion of the International Search Report for PCT/JP2021/033667 dated Oct. 3, 2023.
Japanese Office Action for the related Japanese Patent Application No. 2021-060512 dated Oct. 1, 2024.

* cited by examiner

FIG.2

PT PRINTER MANAGEMENT TABLE

| DEVICE ID | dv1 |
|---|---|
| NUMBER OF PRINTABLE SHEETS | pr1 |
| INK REMAINING AMOUNT | ink1 |
| DEVICE SETTING | dc1 |

FIG.3

ST SERVER MANAGEMENT TABLE

| DEVICE ID | dv1 | dv2 | dv3 |
|---|---|---|---|
| NUMBER OF PRINTABLE SHEETS | pr1 | pr2 | pr3 |
| EXECUTION FLAG | × | ○ | × |

FIG.11

PT PRINTER MANAGEMENT TABLE

| DEVICE ID | dv1 |
|---|---|
| NUMBER OF PRINTABLE SHEETS | pr1 |
| INK REMAINING AMOUNT | ink1 |
| DEVICE SETTING | dc1 |
| EXECUTION FLAG | × |

FIG.12

ST SERVER MANAGEMENT TABLE

| DEVICE ID | dv1 | dv2 | dv3 |
|---|---|---|---|
| NUMBER OF PRINTABLE SHEETS | pr1 | pr2 | pr3 | ically
RECORDING SYSTEM AND NON-TRANSITORY COMPUTER-READABLE MEDIUM

REFERENCE TO RELATED APPLICATIONS

This is a continuation application of International Application No. PCT/JP2021/033667 filed on May 31, 2021, which claims priority from Japanese Patent Application No. 2021-060512 filed on Mar. 31, 2020. The entire contents of the aforementioned applications are incorporated herein by reference.

BACKGROUND ART

A related-art printing system is suggested, which is configured to manage the number of printable sheets of a printer. In this type of printing system, the printer includes card interface equipped with a memory card, and executes printing based on information indicating the number of printable sheets which is stored in the memory card. A user using the printer may cause the printer to print as many as the number of printable sheets indicated by the information stored in the memory card. The user may purchase additional number of printable sheets to thereby continue to use the print service.

DESCRIPTION

In the related-art printer system described above, when purchasing the number of printable sheets, the user performs a predetermined operation on a client device to display a screen for purchasing the number of printable sheets, and input the number of sheets that the user wants to purchase, on the screen. There is a risk that some users will refrain from purchasing the number of printable sheets because they do not know to purchase the additional number of printable sheets.

The present disclosure has been made to solve the above-described problems, and provides a recording system and a non-transitory computer-readable medium, which are capable of promoting the purchase of a recording permission amount of a recording device by notifying a guidance to a user a method of purchasing the recording permission amount, in a system for purchasing the recording permission amount.

A recording system disclosed in this specification is a recording system including: an information processing device; and a recording device, in which the information processing device includes an input interface, and a display unit, the recording device includes a recording unit that executes a recording operation on a recording medium, and executes a recording operation by the recording unit in a range of a recording permission amount for permitting the recording operation by the recording unit, wherein the recording system is configured to execute a tutorial process such that, in the tutorial process, a tutorial operation screen for notifying a guidance to a user about a charge operation is displayed on the display unit of the information processing device, the charge operation being an operation on the input interface for purchasing the recording permission amount.

Further, the contents disclosed in this specification are not limited to being implemented as a recording system, but are beneficially implemented, for example, as a computer-readable program of an information processing device capable of communicating with a recording device.

According to the recording system and the non-transitory computer-readable medium configured as described above, it is possible to allow the user to become familiar with a method of purchasing the recording permission amount, and promote the purchase of the recording permission amount.

FIG. 2 is an explanatory diagram of a printer management table shown in FIG. 1.

FIG. 3 is an explanatory diagram of a server management table shown in FIG. 1.

FIG. 11 is an explanatory diagram of a printer management table according to the second embodiment.

FIG. 12 is an explanatory diagram of a server management table according to the second embodiment.

Figure 1:
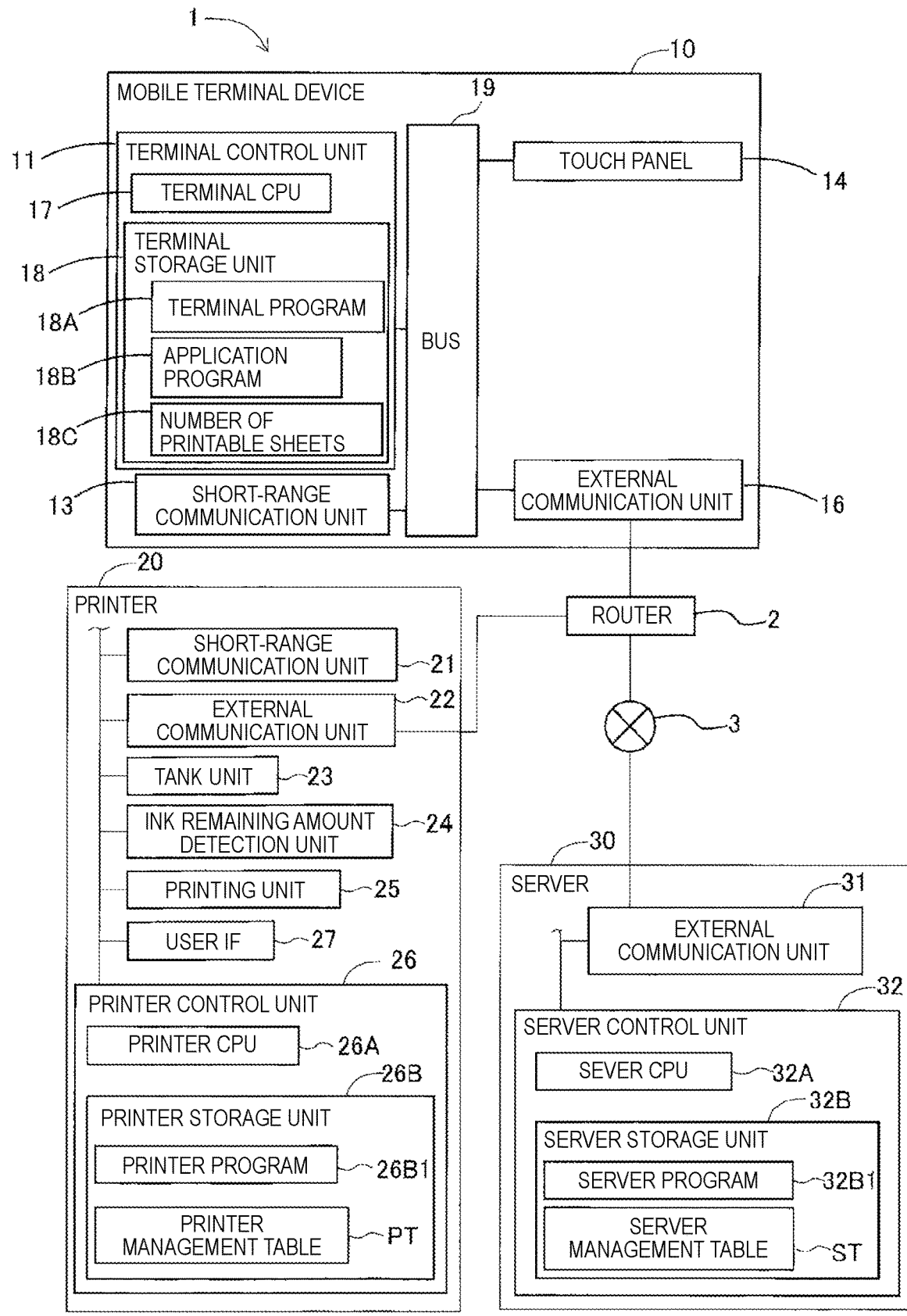
FIG. 1 is a configuration diagram of a printing system according to a first embodiment in the present disclosure.

A printing system 1 according to a first embodiment, which is an embodiment embodying the recording system of the present disclosure, will be described below. FIG. 1 is a configuration diagram of the printing system 1. The printing system 1 includes, for example, a plurality of printers 20 and mobile terminal devices 10, and provides print services to users. In this print service, a user who pays the fee for the number of printable sheets, which is the number of sheets of paper that may be printed by the printer 20, is provided with the number of printable sheets corresponding to the amount of money, and receives the print service for printing. In the following description, setting the number of printable sheets or increasing the number of printable sheets by paying an additional fee may be referred to as "charging".

As will be described later, in the printing system 1 according to the present embodiment, the mobile terminal device 10 may give the server 30 a charge instruction to increase the number of printable sheets. Further, the printing system 1 executes a tutorial process for notifying a guidance to the user about the charge operation method, before actually performing the charge operation. The printing system 1 provides a predetermined number of printable sheets for free (hereinafter sometimes referred to as a free charge number) in response to execution of the tutorial process on any printer 20. The free charge number is, for example, 2000 sheets. In the following description, 2000, which is the free charge number, sheets being charged may be referred to as free-charged. Further, in the tutorial process from the second time onwards, the free charge number is zero. In other words, free charging is not executed in the tutorial process from the second time onwards. The printing system 1 does not provide the predetermined number of printable sheets for free, but may provide the number of printable sheets in response to the user's payment of a service application fee, for example, The printer 20 is, for example, an inkjet printer. The printer 20 sent from the vendor to the user is filled with ink in an amount necessary to print sheets of the free charge number or more (for example, 2000 sheets plus additional sheets). Therefore, in the present print service, until printing the sheets of the free charge number given after obtaining the printer 20, the user does not need to fill the printer 20 with ink or replace the ink cartridge. Therefore, the present print service does not require ink replenishment to the printer 20, and is highly convenient for the user.

Further, when the user wants to print sheets of more than the free charge number, the user pays an additional cost for charging. By purchasing the additional number of printable sheets, the user may continue to use the printer 20. When the remaining amount of ink in the printer 20 is low because the user repeatedly purchases the additional number of printable sheets, the user applies for replacement of the printer 20. The user may continue using the print service by using the newly shipped printer 20.

As shown in FIG. 1, the printing system 1 includes a mobile terminal device 10, a printer 20, and a server 30. In order to avoid complication of the drawing, only one mobile terminal device 10 and one printer 20 are shown in FIG. 1. The mobile terminal device 10 and the printer 20 are connected via the router 2 so as to be able to communicate with each other. Further, the mobile terminal device 10 and the printer 20 are connected to the server 30 via the router 2 and the Internet 3 so as to be able to communicate with each other. Note that the configuration of the network described above is an example. For example, the server 30 may be disposed in a LAN, and the mobile terminal device 10 and the printer 20 may be connected to the server 30 without going through the Internet 3. Further, the number of mobile terminal devices 10 and printers 20 connected to the server 30 may be one or more. Further, one printer 20 may be shared by a plurality of mobile terminal devices 10, and one mobile terminal device 10 may selectively use a plurality of printers 20.

The mobile terminal device 10 causes the printer 20 to print an image on paper (an example of a recording medium in the present disclosure). The mobile terminal device 10 is, for example, a smart phone. The mobile terminal device 10 includes a terminal control unit 11, a short-range communication unit 13, a touch panel 14, and an external communication unit 16. These components may communicate with each other via a bus 19.

The terminal control unit 11 includes a terminal CPU 17 and a terminal storage unit 18. The terminal storage unit 18 is configured by combining, for example, a RAM, a ROM, a flash memory, and the like. The terminal storage unit 18 stores a terminal program 18A, an application program (hereinafter sometimes referred to as an application) 18B, and the number of printable sheets 18C. The terminal program 18A, the application 18B, and the number of printable sheets 18C are stored in a ROM such as a readable and writable flash memory or SSD in the terminal storage unit 18, for example. The terminal program 18A is a program for overall control of the mobile terminal device 10, and provides basic functions and services to the application 18B. The terminal program 18A is, for example, Android (registered trademark) OS or iOS (registered trademark). Further, when the mobile terminal device 10 is, for example, a PC, the terminal program 18A is Windows (registered trademark) OS or the like.

The application 18B is, for example, a program provided by the vendor of the printer 20, and uses the functions of the terminal program 18A to execute various processes such as a setting process and a print instruction for the printer 20 and a charge instruction for the server 30. The terminal control unit 11 executes the terminal program 18A and the application 18B on the terminal CPU 17, and performs overall control of the mobile terminal device 10. The number of printable sheets 18C is information stored on the portable terminal device 10 side, which indicates the number of printable sheets (see FIG. 2) of the printer 20. The mobile terminal device 10 displays the number of current printable sheets 18C on a screen for receiving a print instruction to the printer 20, for example.

In the following description, the terminal control unit 11 that executes the terminal program 18A and the application 18B on the terminal CPU 17 may be simply referred to as a device name. For example, the statement "the mobile terminal device 10" may mean "the terminal control unit 11 that executes the terminal program 18A and the application 18B on the terminal CPU 17". In addition, this specification mainly shows the processes of the terminal CPU 17 according to the instructions described in the program. In other words, processes such as "determination" and "transmission" in the following description represent processes of the terminal CPU 17. The processes by the terminal CPU 17 also include hardware control. The same applies to a printer control unit 26 (printer 20) that executes a printer program 26B1, which will be described later, by a printer CPU 26A, and a server control unit 32 (server 30) that executes a server program 32B1 by the server CPU 32A. Further, "data" in this specification is represented by a computer-readable bit string. Then, data having substantially the same meaning and content but different formats are treated as the same data. The same applies to "information" in the present disclosure.

The terminal storage unit 18 that stores programs (the terminal program 18A and the application 18B) may be a computer-readable storage medium. The computer-readable storage medium is a non-transitory medium. In addition to the above examples, the non-transitory medium includes a recording medium such as a CD-ROM and a DVD-ROM. Further, the non-transitory medium is also a tangible medium. On the other hand, an electrical signal that carries a program downloaded from a server on the Internet is a signal medium, which is a type of computer-readable medium, but is not provided in the non-transitory storage media. The same applies to a printer storage unit 26B storing the printer program 26B1 and a server storage unit 32B storing the server program 32B1, which will be described later.

The short-range communication unit 13 is, for example, a communication interface capable of short-range wireless communication such as Bluetooth (registered trademark) and NFC (abbreviation for Near Field Communication). The touch panel 14 includes, for example, a liquid crystal panel or a contact sensing film attached to the surface of the liquid crystal panel, and changes display contents of the liquid crystal panel based on the control of the terminal control unit 11. Further, the touch panel 14 receives an operation input from the user and outputs a signal corresponding to the operation input to the terminal control unit 11. The touch panel 14 is an example of the display unit and input interface in the present disclosure. The mobile terminal device 10 may include a power button or the like, in addition to the touch panel 14. Further, the user interface provided in the mobile terminal device 10 is not limited to the touch panel 14. For example, the mobile terminal device 10 may separately include a display device such as an LCD or an organic EL display, and an input device such as a push button switch or a slide switch. Therefore, the information processing device in the present disclosure may include the display unit and the input interface as separate devices.

The external communication unit 16 is, for example, a communication interface capable of wireless communication conforming to the Wi-Fi (registered trademark) communication standard. The mobile terminal device 10 is connected to the router 2 via the external communication unit 16. The router 2 is connected to the server 30 via the Internet 3. The external communication unit 16 is not limited to a wireless communication interface, and may be a wired communication interface to which a wired cable such as a LAN cable may be connected.

The printer 20 is, for example, an inkjet color printer. The printer 20 includes a short-range communication unit 21, an external communication unit 22, a tank unit 23, an ink remaining amount detection unit 24, a printing unit 25, a user interface (IF) 27 and a printer control unit 26. The short-range communication unit 21 is, for example, a communication interface capable of short-range wireless communication such as Bluetooth (registered trademark) and NFC. The printer 20 may communicate with the short-range communication unit 13 via the short-range communication unit 21 and acquires setting information and a print instruction from the mobile terminal device 10. The term "acquisition" in the present disclosure is used as a concept that does not require a request. That is, the process in which the printer 20 receiving an instruction without a request is also provided in the concept of "the printer 20 acquires an instruction."

The external communication unit 22 includes, for example, a communication interface capable of wireless communication conforming to the Wi-Fi (registered trademark) communication standard and a wired communication interface to which a LAN cable may be connected. The printer 20 is connected to the router 2 via the external communication unit 22. The external communication unit 22 may be configured to include only one of a wireless communication interface and a wired communication interface.

The tank unit 23 stores ink. In the present embodiment, there are four types of ink (magenta M, cyan C, yellow Y, and black BK), and a plurality of tank units 23 are provided for respective types of ink. In other words, the printer 20 uses a plurality of tank units 23 to respectively store the four types of ink independently. It should be noted that the printer 20 may be a monochrome printer. Further, in the present embodiment, when the printer 20 is supplied from the vendor to the user, each of the plurality of tank units 23 is filled with an amount of ink capable of printing a predetermined number of sheets of paper, for example, in the case of the monochromatic coverage 5%. The predetermined number is the number larger than the free charge number, and may be appropriately set by the vendor that provides the print service.

The tank unit 23 is configured such that the user may not fill it with ink. Specifically, the tank unit 23 is disposed at a position that may not be touched by the user. Further, the tank unit 23 is fixed to the printer 20 in a non-detachable manner. The ink remaining amount detection unit 24 detects the ink remaining amount, which is the remaining amount of ink stored in the tank unit 23. The ink remaining amount detection unit 24 is an optical sensor that is disposed in the tank unit 23 and detects the remaining amount of ink by detecting the height of the liquid level of ink. The ink remaining amount detection unit 24 is disposed in each of the plurality of tank units 23 and detects the remaining amount of ink in each of the plurality of tank units 23. The printer 20 may have a configuration in which the tank unit 23 may be replaced by the user.

The printing unit 25 performs printing using the ink stored in the tank unit 23. The printing unit 25 has, for example, an inkjet head or the like, and prints image data provided in the print instruction acquired from the mobile terminal device 10 on paper by a known inkjet method. The user IF 27 is, for example, a touch panel, a push button switch, or the like, and receives operation input from the user and displays various types of information. The printer 20 may be configured without the user IF 27 such as a touch panel.

The printer control unit 26 performs overall control of the printer 20. The printer control unit 26 includes a printer CPU 26A and the printer storage unit 26B. The printer CPU 26A controls the operation of the printer 20 by executing the printer program 26B1 in the printer storage unit 26B. The printer program 26B1 is a program for overall control of the printer 20, and is a program for causing the printer 20 to execute various processes. The printer storage unit 26B is configured by combining, for example, a RAM, a ROM, a flash memory, an HDD, and the like. The printer program 26B1 is stored, for example, in a rewritable ROM (flash memory or the like) of the printer storage unit 26B.

A printer management table PT is stored in the printer storage unit 26B. The printer management table PT is stored, for example, in a rewritable ROM of the printer storage unit 26B. The printer management table PT is data in which information on the printer 20 regarding use of the print service is stored. As shown in FIG. 2, the printer management table PT stores the device ID, the number of printable pages, the remaining amount of ink, and the device settings in association with each other. The device ID is, for example, a serial number set by the vendor of the printer 20, and is unique information that may identify any printer 20 from other printers 20. The device ID is not limited to the serial number, and may be other device-specific information such as the MAC address of the short-range communication unit 21 or the external communication unit 22, for example. The number of printable sheets indicates the number of sheets on which printing may be performed by the printer 20. The user using the printer 20 may print within the range of the number of printable sheets stored in the printer management table PT (as many as the number of sheets).

When the user pays a fee, the number of sheets corresponding to the paid fee is added (charged) to the number of printable sheets. On the other hand, the number of sheets used for printing by the printer 20 is subtracted from the number of printable sheets. For example, when the number of printable sheets becomes zero or less, the printer 20 enters a state in which printing may not be executed. For example, the printer 20 executes printing each time a print instruction is received, subtracts the number of prints from the number of printable sheets, and executes printing until the number of printable sheets becomes zero. When the number of printable sheets reaches zero, the printer 20 prohibits the execution of printing and notifies the mobile terminal device 10 of an error. Alternatively, when the number of prints specified in the print instruction is equal to or greater than the number of printable sheets, at the time of reception of the print instruction, the printer 20 may notify the mobile terminal device 10 of an error while leaving the number of printable sheets remaining without executing printing.

The remaining amount of ink indicates the remaining amount of ink detected by the ink remaining amount detection unit 24. The printer 20 stores, for example, the remaining amount of ink detected by the ink remaining amount detection unit 24 in the printer management table PT, after executing an operation that uses ink such as replenishment of ink to the inkjet head, nozzle check, and printing. The device settings are setting information such as the functions of the printer 20 (printing, or the like), the settings of each function (paper size, color, magnification, or the like), and the language displayed on the user IF 27.

As shown in FIG. 1, the server 30 has an external communication unit 31 and a server control unit 32. The external communication unit 31 is connected to the mobile terminal device 10 and the printer 20 via the Internet 3 and router 2. The server control unit 32 includes a server CPU 32A and a server storage unit 32B. The server CPU 32A performs overall control of the operation of the server 30 by executing the server program 32B1 in the server storage unit 32B. The server program 32B1 is a program for overall control of the server 30, and is a program for causing the server 30 to execute various processes.

The server storage unit 32B is configured by combining, for example, a RAM, a ROM, a flash memory, an HDD, and the like. A server management table ST is stored in the server storage unit 32B. The server management table ST is data in which information necessary for using the print service is stored. The server management table ST stores information about each printer 20 that uses the print service in association with the device ID of the printer 20, and is managed by the vendor.

As shown in FIG. 3, the server management table ST stores a device ID, the number of printable sheets, and an execution flag in association with each other. The device ID and the number of printable sheets are the same types of data as in the printer management table PT described above, and the data of the printer management table PT corresponding to the same device ID is stored. With respect to the plurality of printers 20 using the print service, the server 30 of the present embodiment manages the number of printable sheets of each printer 20, using the server management table ST in which the device ID is associated with the number of printable sheets. The server 30 executes a synchronization process of synchronizing with the printer 20 the number of printable sheets, which increases or decreases according to the print instruction or the charge instruction of the mobile terminal device 10, and manages the latest number of printable sheets in the server management table ST.

The execution flag is information indicating whether or not a tutorial process, which will be described later, has been executed and free charging for the free charge number has been executed for any printer 20. For example, the execution flag is set with a value indicating that free charging has been executed or a value indicating unexecuted. The execution flag is an example of free charge execution information in the present disclosure. The free charge execution information in the present disclosure is not limited to a binary value, and may include, for example, other types of information such as the date and time when free charging is executed in addition to the information indicating whether or not the charge has been executed. "o" shown in FIG. 3 indicates that a value indicating that the free charging has been completed is set, and "x" indicates that the free charging has not been executed.

The information of the printer management table PT and the server management table ST shown in FIGS. 2 and 3 are examples. For example, when a different free charge number is set for each printer 20 (device ID), each device ID and the free charge number may be registered in advance in association with each other in the server management table ST. Further, the server 30 may manage permission/inhibition of execution of printing for the printer 20 in the server management table ST. For example, the server 30 may store activation information in association with each device ID. The activation information herein means, for example, permitting the execution of printing by the printing unit 25 when data indicating ON is set, and restricting the execution of printing by the printing unit 25 when data indicating OFF is set. The server 30 may limit the printing operation of the printer 20 by, for example, synchronizing the activation information in the printer management table PT of each printer 20 with the activation information in the server management table ST. Further, the server 30 may acquire the remaining amount of ink of each printer 20 from the printer management table PT, store it in the server management table ST, and notify the mobile terminal device 10 of replacement of the printer 20 according to the decrease in the remaining amount of ink.

Figure 4:
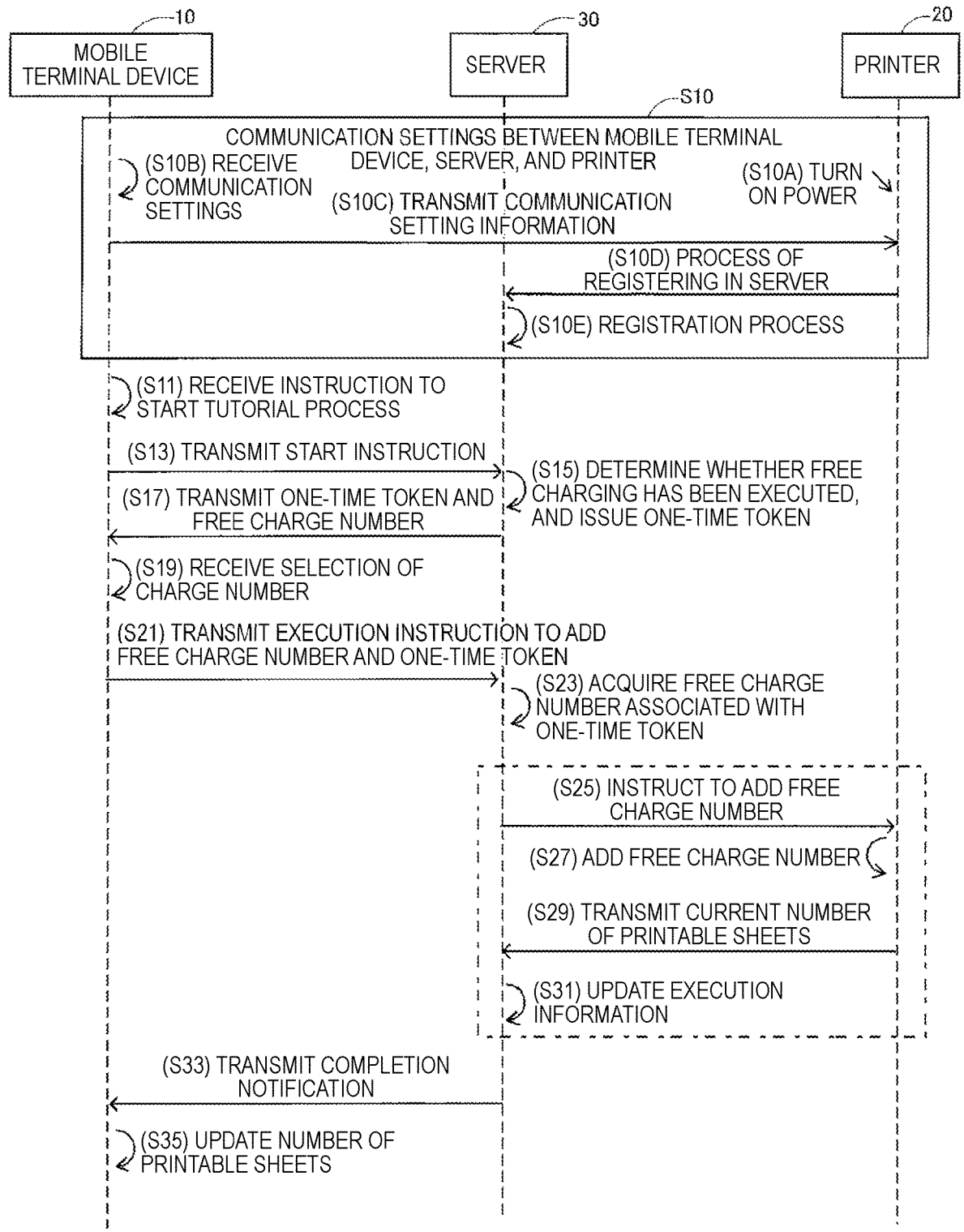
FIG. 4 is a sequence diagram when a tutorial process is executed.

Next, the tutorial process executed by the printing system 1 will be described. FIG. 4 shows the user's work and the contents of each device's process in the tutorial process. The tutorial process is a process of notifying a guidance to the user how to perform an operation of charging (hereinafter, may be referred to as a charge operation) via the mobile terminal device 10. Further, in a state where any printer 20 is selected by the application 18B, when the tutorial process for the first time is executed for the any printer 20, the server 30 executes free charging, and when the tutorial process from the second time onwards is executed, the server 30 does not execute free charging. Furthermore, the difference between the tutorial process for the first time and the normal charge process (see FIGS. 8 and 9), which will be described later, is that the normal charge process increases (charges) the number of printable sheets at least along with the fee settlement process while the tutorial process increases the number of printable sheets without settlement process. In the following description, first, the tutorial process for the first time will be described.

For example, the user performs the work shown in FIG. 4, when the user purchases the printer 20 for the first time and the printer 20 arrives from the vendor. Each of the mobile terminal device 10, the printer 20, and the server 30 executes each process in accordance with the work of the user. Note that an arrow pointing downward to the right shown in FIG. 4 indicates an operation by the user. Further, the contents and order of the processes and work shown in FIG. 4 are examples. Further, a case of setting the printer 20 with the device ID "dv1" (see FIG. 2) as the printer 20 will be described. That is, in the following description, a case will be described in which the tutorial process for the first time is executed (for the first time) for the printer 20 with the device ID "dv1".

First, in step (hereinafter simply referred to as S) 10 shown at the top of the sequence diagram of FIG. 4, as a premise for starting a process from S11 onwards, it is assumed that settings enabling communication between the mobile terminal device 10, the server 30, and the printer 20 have been completed. Specifically, for example, the user connects the printer 20 received from the vendor to an outlet at home and turns on the power (S10A). In addition, the mobile terminal device 10 receives communication settings according to the user's operation input (S10B). For example, the user operates the touch panel 14 of the mobile terminal device 10 to make communication settings such as the SSID of the router 2 and the encryption key for the terminal program 18A (S10B). The mobile terminal device 10 becomes communicable with the router 2 via the external communication unit 16. After making the communication settings, the user activates the application 18B (10B). For example, when the application 18B is activated, the mobile terminal device 10 executes the communication setting of the printer 20 using short-range wireless communication.

When the application 18B is activated for the first time, the mobile terminal device 10 enables the short-range wireless function of the short-range communication unit 13 via the terminal program 18A (S10B). On the other hand, for example, the printer 20 enables the short-range wireless function by the short-range communication unit 21, when the power is turned on in a state where communication is not set, or in response to an operation input to the user IF 27 (S10A). The application 18B displays on the touch panel 14 an instruction to bring the mobile terminal device 10 closer to the printer 20. When the user brings the mobile terminal device 10 close to the printer 20, the application 18B transmits communication setting information necessary for connecting to the router 2, such as the SSID of the router 2 and encryption key, via the short-range communication units 13 and 21 to the printer 20 by short-range wireless communication (S10C). The printer 20 connects to the router 2 from the external communication unit 22, based on the communication setting information acquired from the application 18B. Before transmitting the communication setting information, the application 18B may check the user, such as a display process of the printer 20 detected by short-range wireless communication, an input process of authentication information of the printer 20 set in advance by the vendor, and the like. Further, the communication setting method for the printer 20 described above is an example. For example, the user may operate the user IF 27 of the printer 20 to input the IP address, the SSID of the router 2, or the like, and execute communication settings.

When the printer 20 becomes communicable with the router 2 via the external communication unit 22, the printer 20 accesses the server 30 via the Internet 3 and requests a registration process (S10D). The access destination of the server 30 may be set in the printer storage unit 26B in advance by the vendor or the like, or may be notified to the printer 20 from the application 18B. The printer 20 notifies the server 30 of, for example, the terminal ID and the ID of the application 18B acquired from the mobile terminal device 10, the device ID of the printer 20, and the like (S10D). Thereby, the server 30 may identify the printer 20 or the mobile terminal device 10 of the communication destination.

The server 30 registers the device ID (for example, "dv1") notified in S10D in the server management table ST (S10E). The server 30, for example, sets zero as the number of printable sheets "pr1" (see FIG. 3) associated with the device ID "dv1". Further, the server 30 sets, for example, data indicating unexecuted "x", as the information of the execution flag associated with the device ID "dv1".

It should be noted that the registration process to the server 30 and the notification process of the terminal ID and the device ID of the printer 20 may be executed by the mobile terminal device 10. Alternatively, the mobile terminal device 10 and the printer 20 may access the server 30 separately to execute the registration process and ID notification.

Further, communication between the mobile terminal device 10, the printer 20, and the server 30 is preferably communication with security secured. Ensuring security herein means, for example, executing authentication of a communication partner, encryption of communication data, detection of falsification of communication data, and the like. A method of ensuring communication security is not particularly limited. Specifically, the vendor side may ensure security, by executing authentication of communication partners and encryption of communication data using authentication tokens or encryption keys set in the application 18B and the printer program 26B1. Alternatively, security may be ensured using a known secure communication protocol such as SSL. Communication among the mobile terminal device 10, the printer 20, and the server 30 may be communication without executing encryption or the like. Further, the timing for executing the above-described communication settings and process of ensuring communication security is not limited to the timing when the new printer 20 is shipped from the vendor. For example, the timing may be such that the user of the printer 20 changes, and a new user is taught the charging method. Specifically, it may be the timing when the network setting of the printer 20 or the printer name is changed.

After the communication settings and the like in S10 described above is completed, as shown in S11 of FIG. 4, the mobile terminal device 10 receives an instruction to start the tutorial process via the application 18B. For example, as described above, after securing secure communication between the printer 20 and the server 30, the mobile terminal device 10 displays a menu screen 51 shown in FIG. 5 on the touch panel 14 via the application 18B. The mobile terminal device 10 displays on the menu screen 51, for example, a print icon 52 for instructing the printer 20 to execute a print function, a setting icon 55 for setting the printer 20, a charge icon 56 for a charge process and a tutorial process, and a status icon 57 for checking the state of the printer 20.

Further, the mobile terminal device 10 displays the information on the printer 20 with the device ID "dv1", which is the current communication partner, for which the above-described secure communication has been secured, on a printer display portion 61 provided in the lower part of the menu screen 51. The mobile terminal device 10 displays, for example, the texts "online", and displays on the printer display portion 61 that communication with the printer 20 is possible. When a selection button 63 on the printer display portion 61 is touch-operated, the mobile terminal device 10 may display a list of printer names (model numbers, or the like) of the printers 20 detected on the same network, and receive the selection of the printer 20 to execute printing and the like. That is, the mobile terminal device 10 may receive a change of the printer 20 selected on the mobile terminal device 10 side, with the selection button 63, in the tutorial process and the charge process.

The mobile terminal device 10 displays on the charge icon 56 a message 65 indicating that free charge may be executed, based on a predetermined condition. Thus, the user may be prompted to perform the charge operation for free charging. The predetermined condition herein is, for example, a condition under which communication with the new printer 20 becomes possible by executing S10 described above. In this case, the message 65 may be displayed each time a new printer 20 is connected to the mobile terminal device 10. Alternatively, the predetermined condition may be, for example, a condition for acquiring notification instructions from the server 30. This allows the server 30 to display the message 65 on the mobile terminal device 10 in accordance with the conditions for free charging.

Figure 7:
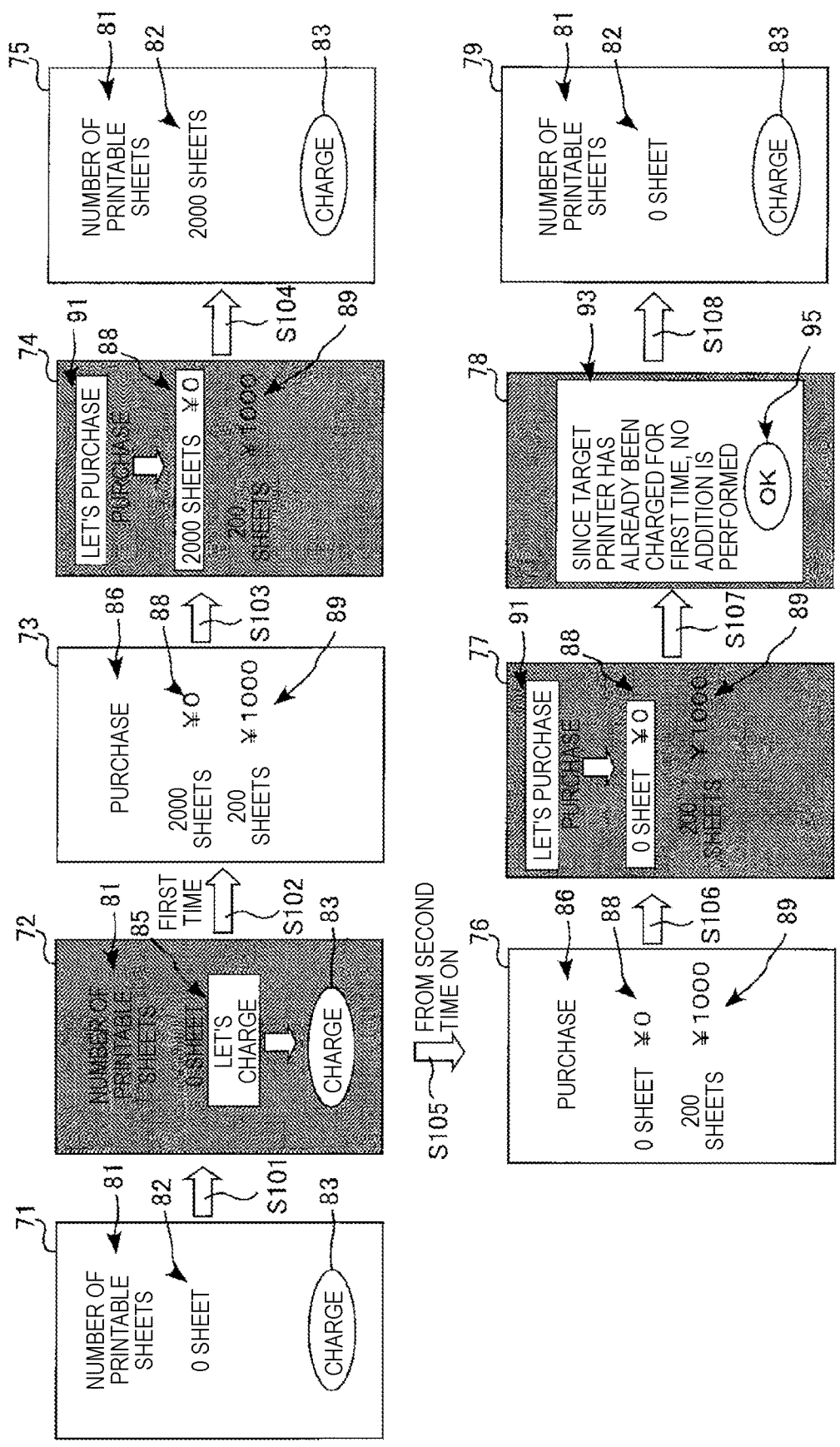
FIG. 7 is a diagram showing a tutorial operation screen displayed on the display unit of the mobile terminal device.

When an operation to select the charge icon 56 is received on the touch panel 14 while the message 65 is displayed, the mobile terminal device 10 displays a tutorial operation screen for notifying a guidance to the user about the charge operation on the touch panel 14. FIG. 7 shows an example of the tutorial operation screen. For example, when the charge icon 56 is selected while the message 65 is displayed, the mobile terminal device 10 displays the tutorial operation screen 71 and then displays the tutorial operation screen 72 on the touch panel 14. The application 18B of the present embodiment instructs the user while showing the screen transition of the normal charge process (see FIGS. 8 and 9) requiring for payment of fees, which will be described later. Further, the application 18B displays the part that needs to be operated and the other portion to be distinguished such that the user does not get lost in the operation, on the tutorial operation screen 72 or the like.

In addition, as will be described later, when the tutorial process for the first time for any printer 20 is completed and free charging is completed, the mobile terminal device 10 erases the message 65. When the charge icon 56 is selected without displaying the message 65, the mobile terminal device 10 displays the charge execution icon 66 and the tutorial execution icon 67 shown in FIG. 6. Although the details will be described later, the user may start the charge process or the tutorial process, by selecting the charge execution icon 66 or the tutorial execution icon 67. Therefore, when the charge icon 56 is operated, in a state where the new printer 20 is connected and the printer 20 is selected, the mobile terminal device 10 displays the message 65 and switches the display to the tutorial operation screen 71 shown in FIG. 7 to start tutorial. In addition, after the device ID of the printer 20 is transmitted to the server 30 and it is checked whether or not the printer 20 with the device ID has been charged for free, the mobile terminal device 10 may display the message 65. Further, a user who has received once a tutorial, which will be described later, may want to execute free charging without receiving the tutorial when using a new (after replacement) printer 20. Therefore, for example, when the charge icon 56 is selected while the message 65 is displayed, the mobile terminal device 10 may display a message such as "Do you want to execute free charge without receiving the tutorial?". When receiving an instruction to execute free charging without receiving the tutorial, the mobile terminal device 10 may execute free charging without executing the tutorial described below. Thus, the user may charge the second and subsequent printers 20 for free without receiving the tutorial. Further, when the printer 20 is replaced due to a failure or lack of ink, or when the replaced printer 20 is selected and the tutorial process is performed, free charging may not be executed even if it is the tutorial process for the first time. In other words, the printer 20 after replacement may be excluded from free charging target.

As shown in FIG. 7, the mobile terminal device 10 temporarily displays the tutorial operation screen 71, and then automatically switches the screen to the tutorial operation screen 72. The tutorial operation screen 71 is a screen used in the normal charge process, which will be described later. The mobile terminal device 10 displays on the tutorial operation screen 71, a message 81 representing a text "the number of printable sheets", number information 82, and a charge button 83. The mobile terminal device 10 displays the number of printable sheets 18C in the terminal storage unit 18, that is, the number of printable sheets of the current printer 20 in the number information 82. The mobile terminal device 10 may acquire information on the number of printable pages of the printer 20 in S10. At this stage, the printer 20 has not been charged. Therefore, the number of printable sheets is, for example, zero. The charge button 83 is a button for receiving a charge start instruction. Although the mobile terminal device 10 displays these buttons and the like on the tutorial operation screen 71, the mobile terminal device 10 does not receive the operation on the touch panel 14 on the tutorial operation screen 71, and switches the display to the tutorial operation screen 72 (S101).

The mobile terminal device 10 displays a screen similar to the tutorial operation screen 71, as the tutorial operation screen 72. Further, the mobile terminal device 10 displays a message 85 prompting an operation of the charge button 83 as a portion requiring operation, on the tutorial operation screen 72. Further, the mobile terminal device 10 fills out portions other than the charge button 83 with, for example, gray color to indicate the user that the gray portions are not to be operated such that the portion other than the charge button 83 is not operated. Thus, the user may be taught that the charge button 83 needs to be operated first as a procedure for performing the charge operation.

When the charge button 83 is operated on the tutorial operation screen 72, the mobile terminal device 10 determines in S11 of FIG. 4 that an instruction to start the tutorial process has been received (S11), and transmits the start instruction to the server 30 (S13). Subsequent communication between devices, such as the transmission of the start instruction in S13, is performed by the above-described communication with security secured.

When the server 30 acquires the start instruction of S13, the server 30 determines whether or not for the printer 20 to be charged, free charging has been executed, based on the execution flag of the server management table ST (S15). For example, in S13, the mobile terminal device 10 transmits to the server 30 the device ID of the printer 20 selected on the printer display portion 61 of FIG. 5, that is, the printer 20 selected when the tutorial process is started (S13). The server 30 searches the server management table ST based on the device ID acquired from the mobile terminal device 10, and determines whether or not the execution flag associated with the device ID indicates execution completion (S15). Note that the server 30 may not acquire the device ID from the mobile terminal device 10 in S13. For example, in the registration process of S10D, the server 30 may use the device ID of the printer 20 that has accessed the server 30, as the device ID of the printer 20 that is selected when the tutorial process is started.

The example shown in FIG. 3 indicates that the execution flag for the device ID "dv1" is unexecuted "x". Therefore, the server 30 sets a predetermined number (for example, 2000 sheets) as the free charge number. Further, the server 30 issues a one-time token in S15. This one-time token is information for identifying the mobile terminal device 10 that is the transmission source, and is, for example, a combination of numbers and alphabets, and identification information that is valid only for a certain period of time. The server 30 temporarily stores the issued one-time token and the value of the free charge number (2000 sheets in this case) in association with each other in the server storage unit 32B. The server 30 transmits the one-time token associated in S15 and information on the free charge number to the mobile terminal device 10 (S17).

Figure 9:
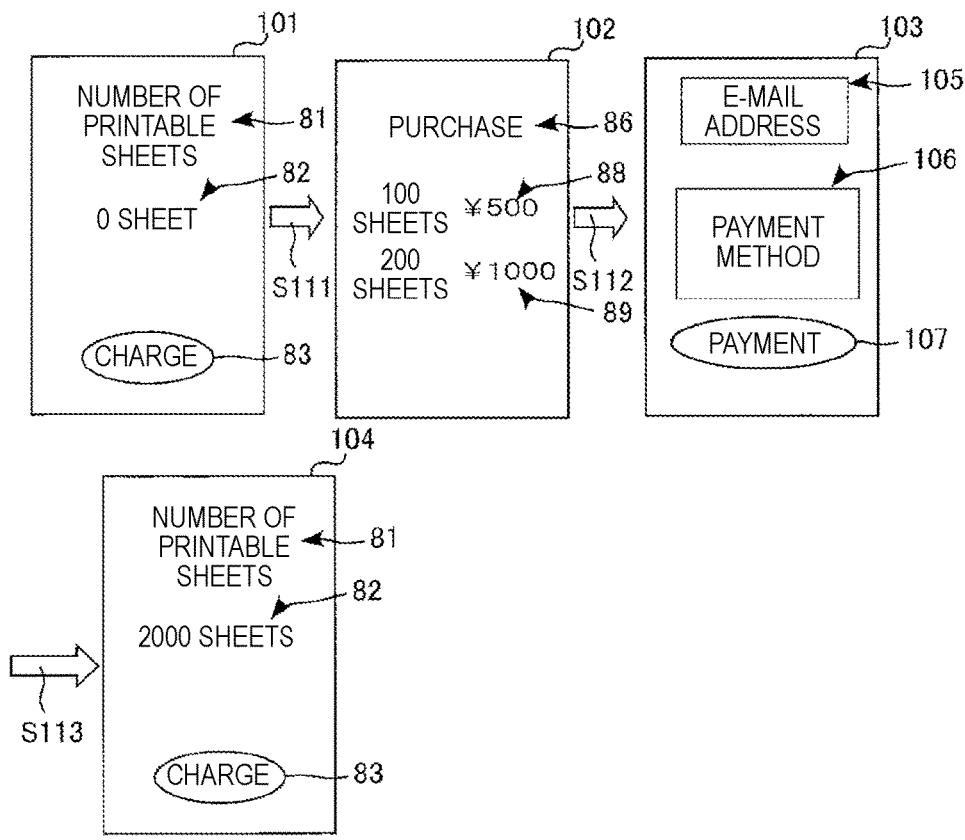
FIG. 9 is a diagram showing a charge operation screen displayed on the display unit of the mobile terminal device when the normal charge process is executed.

On the other hand, as shown in FIG. 7, when the charge button 83 on the tutorial operation screen 72 is operated, the mobile terminal device 10 temporarily displays the tutorial operation screen 73 and then automatically switches the display on the touch panel 14 to the tutorial operation screen 74 (S102, S103). Similar to the tutorial operation screen 71, the tutorial operation screen 73 is a screen that is displayed in a normal charge operation. The mobile terminal device 10 displays a message 86 representing a text "purchase" and selection icons 88 and 89 on the tutorial operation screen 73. The mobile terminal device 10 displays the number of printable sheets to be purchased and the purchase price of the number of printable sheets in a line on the selection icons 88 and 89. As shown in FIG. 9, in the normal charge operation, the mobile terminal device 10 receives from the user a selection of the selection icons 88 or 89 corresponding to the number of printable sheets to be purchased from among the plurality of selection icons 88 and 89 (see a charge operation screen 102). However, in the tutorial process, the mobile terminal device 10 does not receive the operation on the touch panel 14 on the tutorial operation screen 73, and switches the display to the tutorial operation screen 74.

The mobile terminal device 10 displays a screen similar to the tutorial operation screen 73, as the tutorial operation screen 74. Further, the mobile terminal device 10 displays a message 91 prompting an operation of the selection icon 88 as a portion requiring operation, on the tutorial operation screen 74. The mobile terminal device 10 displays on the selection icon 88 that the number of printable sheets is 2000 sheets and the fee is zero yen (free), for example. In addition, the mobile terminal device 10 displays on the selection icon 89 that the number of printable sheets is 200 sheets and the fee is 1000 yen. The mobile terminal device 10 fills out the portion other than the selection icon 88 with, for example, gray color, and does not receive any operation on the selection icon 89 such that the selection icon 89 other than the selection icon 88 for free charge is not operated. Thus, it is possible to display the tutorial operation screen 74 simulating the screen of the actual charge operation, and to reduce an erroneous operation on the selection icon 89 other than the selection icon 88 for free charge. Note that the process for preventing the user who is receiving the tutorial from performing the actual charge operation is not limited to the switching process of switching between enabling/disabling the operation on the selection icon 89 as described above, and may be, for example, a process of hiding the selection icon 89 on the operation screen 73.

For example, the mobile terminal device 10 displays the tutorial operation screen 74, and when receiving the information of S17, enables the operation on the selection icon 88 (S19). Thereby, the user may select the charge number, that is, instruct the execution of free charging (S19). The mobile terminal device 10 may display a message such as "Please wait for a while" on the tutorial operation screen 74, when the information of S17 may not be acquired while switching the display to the tutorial operation screen 74. When receiving an operation on the selection icon 88 on the tutorial operation screen 74, the mobile terminal device 10 transmits an execution instruction to add the free charge number and the one-time token acquired in S17 to the server 30 (S21). When the server 30 acquires the execution instruction of S21, the server 30 acquires the free charge number associated with the one-time token acquired in S21 (S23). As described above, when issuing a one-time token, the server 30 stores the free charge number in association with the one-time token in the server storage unit 32B (S15). Based on the one-time token acquired in S21, the server 30 acquires the associated free charge number, from the server storage unit 32B. Since this time is the tutorial process for the first time, 2000 sheets of the free charge number are obtained. Information for identifying the mobile terminal device 10 of the transmission source is not limited to one-time tokens such as numbers and alphabets. For example, the server 30 may compare hash values of the data value transmitted in S17 and the data value acquired in S21 to determine whether the transmission destination of S17 and the transmission source of S21 match.

When the free charge number is acquired in S23, the server 30 transmits to the printer 20 an instruction to add the acquired free charge number to the number of printable sheets (S25). The designated printer 20 is the printer 20 that acquires the device ID in S13, that is, targeted for the tutorial process (device ID is "dv1"). When the addition instruction of S25 is acquired, the printer 20 adds the number of printable sheets (for example, zero sheet) in the printer management table PT to the free charge number (for example, 2000 sheets) (S27). After adding the free charge number to the number of printable sheets, the printer 20 transmits to the server 30, the number of printable sheets after addition, that is, the current number of printable sheets in the printer management table PT (S29).

When the number of printable sheets is acquired in S29, the server 30 overwrites the information in the server management table ST associated with the printer 20 of the transmission source, that is, the printer 20 (device ID "dv1") that is the target of the tutorial process (S31). The server 30 updates the execution flag of the device ID "dv1" to the value of execution completion (S31). Thereby, the information on the execution flag may be updated according to the notifying a guidance of the charge operation method and the addition of the free charge number. Further, the server 30 updates the number of printable sheets for the device ID "dv1" with the number of printable sheets acquired in S29 (S31). Thus, the number of printable sheets in the printer management table PT and the number of printable sheets in the server management table ST may be synchronized. If the printer 20 is charged in advance with the number of printable sheets by a purchase privilege or the like, the number of printable sheets in the server management table ST may be updated with the information obtained by adding the free charge number to the number of printable sheets. Although the server 30 executes the registration process of the server management table ST before executing the free charging in S10D and 10E, that is, S25, or the like, the registration process may be executed in S31.

After updating the server management table ST in S31, the server 30 transmits to the mobile terminal device 10 a completion notification indicating that the free charging has been completed (S33). The server 30 transmits the number of printable sheets updated in S31 to the mobile terminal device 10, for example, in the completion notification of S33. The mobile terminal device 10 updates the number of printable sheets 18C of the own device with the number of printable sheets acquired from the server 30 in the completion notification of S33 (S35). Thereby, the number of printable sheets in the mobile terminal device 10, the printer 20, and the server 30 may be matched. In addition, the mobile terminal device 10 may not acquire the number of printable sheets in S33, but may add the free charge number acquired in S17 to the number of printable sheets 18C, and execute a process of synchronizing the number of printable sheets of the server 30 later.

As shown in FIG. 7, when the selection icon 88 is selected on the tutorial operation screen 74, the mobile terminal device 10 displays the tutorial operation screen 75 (S104). For example, when switching the display from the tutorial operation screen 74 to the tutorial operation screen 75, the mobile terminal device 10 may display texts such as "Please wait for a while" and "Free charging is in progress" on the touch panel 14 considering the processing time of S21 to S33 described above. The mobile terminal device 10 displays the message 81, the number information 82, and the charge button 83 on the tutorial operation screen 75 in the same manner as the tutorial operation screen 71. Further, the mobile terminal device 10 displays the number of printable sheets acquired from the server 30 (for example, 2000 sheets which is the free charge number) in the number information 82. With this, it is possible to allow the user to become familiar with the charge operation and perform free charging.

Figure 5:
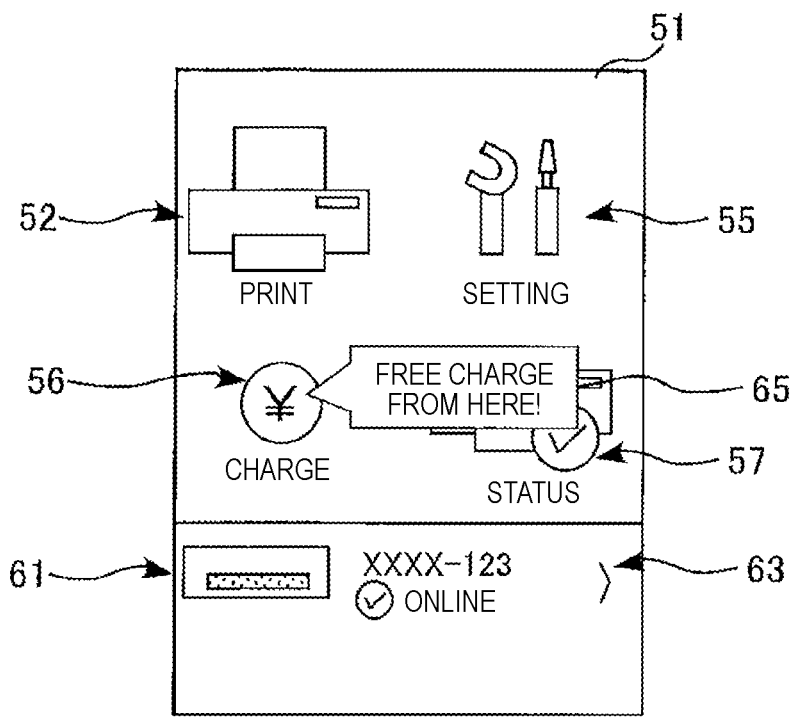
FIG. 5 is a diagram showing a menu screen displayed on a display unit of a mobile terminal device.
Figure 6:
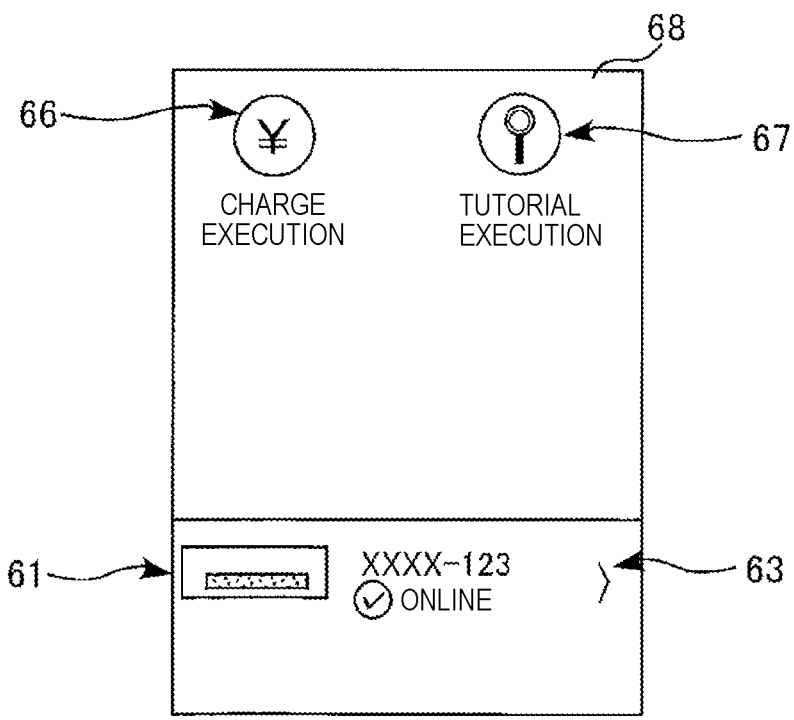
FIG. 6 is a diagram showing a selection screen displayed on the display unit of the mobile terminal device.

Next, a case where the tutorial process from the second time onwards is executed in a state where any printer 20 is selected will be described. In the following description, the description of the same contents as in the tutorial process for the first time described above will be omitted as appropriate. For example, when another user uses the printer 20 after the tutorial process for the first time is completed, the user may want to know the charge operation. For example, when the tutorial process for the first time for any printer 20 is completed and free charging is completed, the mobile terminal device 10 erases the message 65. Further, mobile terminal devices 10 other than the mobile terminal device 10 that has executed the tutorial process for the first time, for example, confirms whether or not the selected printer 20 is to be charged for free via the application 18B, and erase the message 65. The method of checking whether or not the free charging is executed is not particularly limited, but the application 18B may check with the server 30 or the printer 20 whether or not the free charging is executed. For example, when the charge icon 56 in FIG. 5 is selected with the message 65 deleted, the mobile terminal device 10 displays the touch panel 14, a selection screen 68, on which a charge execution icon 66 for executing charging and a tutorial execution icon 67 for executing a tutorial are displayed, as shown in FIG. 6. When the tutorial execution icon 67 is touch-operated, the mobile terminal device 10 displays a message such as "Would you like to start the charge operation tutorial?" to check the user's intention. When receiving the operation input for starting the tutorial, the mobile terminal device 10 starts the process of displaying the tutorial operation screens 71 and 72 shown in FIG. 7.

For example, in the tutorial process from the second time onwards, the communication setting in S10 has been completed, and the process starts from S11 in FIG. 4. When the server 30 acquires the start instruction of S13, the server 30 determines whether or not free charging has been executed for the printer 20 to be charged (S15). In the tutorial process from the second time onwards, for example, in the server management table ST, the execution flag associated with the device ID "dv1" has a value indicating execution completion "o." Therefore, the server 30 determines that the free charging has been completed, issues a one-time token, and associates the issued one-time token with information indicating that the free charge number is zero. In addition, the server 30 responds with information indicating that the free charge number is zero (S17). Thus, for any printer 20, free charging for a predetermined free charge number is executed only in the tutorial process for the first time, and free charging is not executed from the second time onwards. In addition, even in the tutorial process from the second time onwards, the server 30 may execute free charging for the predetermined free charge number.

In S15, the server 30 transmits the information indicating that the free charge number is zero and the one-time token in association with each other, to the mobile terminal device 10 (S17). As shown in FIG. 7, the mobile terminal device 10 displays the tutorial operation screens 76 and 77, based on the touch operation of the charge button 83 on the tutorial screen 72 (S105). The mobile terminal device 10 automatically switches between the tutorial operation screens 76 and 77 in the same manner as the first tutorial operation screens 73 and 74 (S105 and S106). The mobile terminal device 10 displays, for example, zero as the number of printable sheets of the selection icon 88, that is, the number of printable sheets to be added, on the tutorial operation screens 76 and 77 (S19, S106). This makes it possible for the user to recognize that the free charge number is zero.

When receiving an operation on the selection icon 88 on the tutorial operation screen 74, the mobile terminal device 10 transmits an execution instruction to add the free charge number and the one-time token acquired in S17 to the server 30 (S21). The server 30 acquires the free charge number (zero in this case) associated with the one-time token acquired in S21 (S23).

For example, when the server 30 acquires information indicating that the free charge number is zero in S23, the server 30 does not execute an addition instruction to the printer 20 indicated by broken lines in FIG. 4, and the update process (S25 to S31) of the server management table ST. In other words, free charging is not executed. This is because even when the process of S25 to S31 is executed and the free charge number of zero is added, actual free charging is not executed and the number of printable sheets in the printer management table PT does not change. It should be noted that the server 30 may execute S25 to S31 based on the free charge number of zero. Then, the server 30 may acquire the latest number of printable sheets from the printer 20 and execute a process of updating (synchronizing) the number of printable sheets in the server management table ST.

After executing S23, the server 30 transmits a completion notification to the mobile terminal device 10 (S33). When the completion notification of S33 is acquired, the mobile terminal device 10 updates the display on the touch panel 14, without executing the process of updating the number of printable sheets 18C of the mobile terminal device 10 of S35. As shown in FIG. 7, when the selection icon 88 is selected on the tutorial operation screen 77, the mobile terminal device 10 displays the tutorial operation screen 78 (S107). The mobile terminal device 10 displays on the tutorial operation screen 78 a message 93 that "for the target printer 20, free charging for the first time has already been executed" or "the free charge number is not added". In addition, the mobile terminal device 10 displays a confirm button 95 with OK characters on the tutorial operation screen 78. The user operates the confirm button 95 after checking the content of the message 93.

When the confirm button 95 is operated, the mobile terminal device 10 displays the tutorial operation screen 79 (S108). The mobile terminal device 10 displays the message 81, the number information 82, and the charge button 83 on the tutorial operation screen 79 in the same manner as the tutorial operation screen 71. Further, the mobile terminal device 10 displays the number of printable sheets 18C (for example, zero sheet) in the number information 82. With this, it is possible to notifying a guidance to the user about the charge operation from the second time onwards. It should be noted that the content of the tutorial process described above is an example. For example, in the above-described tutorial process from the second time onwards, there is no need to issue an addition instruction to the printer 20 or the like. Therefore, after acquiring the information indicating that the free charge number is zero in S17, the mobile terminal device 10 may transition only the tutorial operation screen without executing communication with the server 30.

Figure 8:
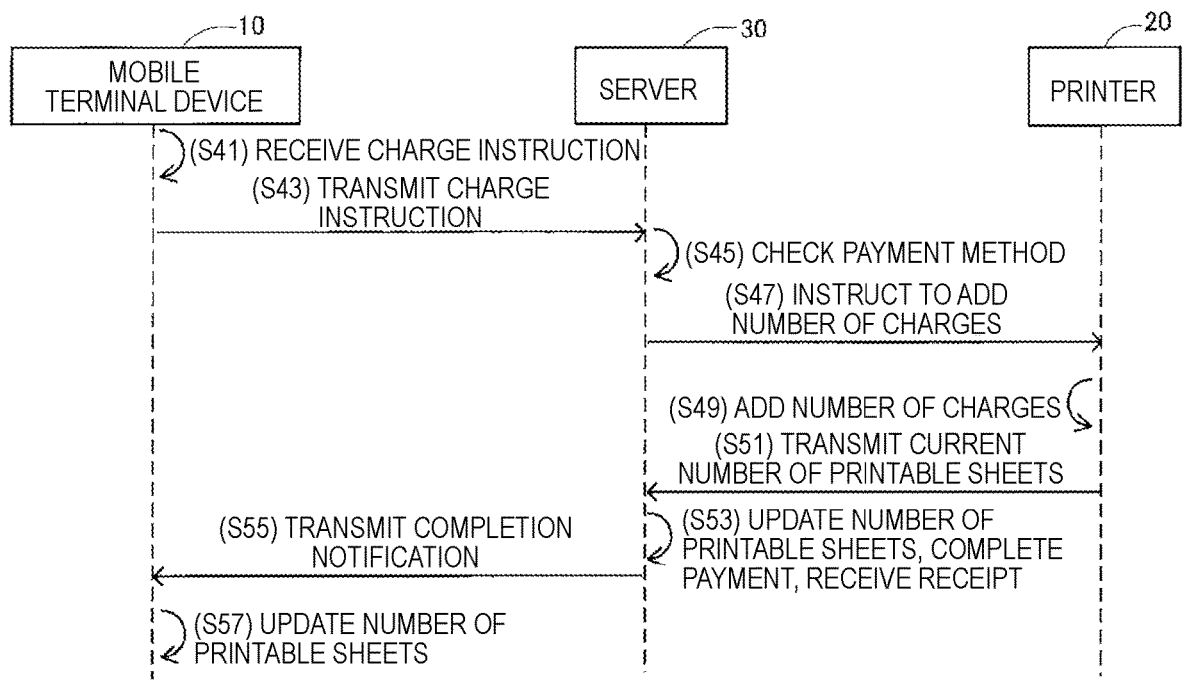
FIG. 8 is a sequence diagram when a normal charge process is executed.

Next, a normal charge process will be described. In the following description, the same reference numerals are given to the same contents as in the tutorial process described above, and the description thereof will be omitted as appropriate. FIG. 8 shows the user's work and the contents of each device's process in the normal charge process. FIG. 9 shows screen transitions of the touch panel 14 of the mobile terminal device 10 in a normal charge process.

First, in S41 of FIG. 8, the mobile terminal device 10 receives a charge instruction. For example, the mobile terminal device 10 executes the application 18B, and when the charge icon 56 is operated in the state where any printer 20 is selected and the message 65 is not displayed on the menu screen 51 shown in FIG. 5, a selection screen 68 shown in FIG. 6 is displayed. When the charge execution icon 66 is touch-operated on the selection screen 68, the mobile terminal device 10 displays the charge operation screen 101 of FIG. 9 on the touch panel 14.

The charge operation screen 101 has the same screen configuration as the tutorial operation screen 71 in FIG. 7. When the charge button 83 on the charge operation screen 101 is operated, the mobile terminal device 10 displays the charge operation screen 102 on the touch panel 14 (S111). The charge operation screen 102 has the same configuration as the tutorial operation screen 73 in FIG. 7. In the normal charge process, the mobile terminal device 10 does not transmit an instruction to start the tutorial process (S13 in FIG. 4) or the like to the server 30. Further, the mobile terminal device 10 does not acquire the free charge number from the server 30 and does not display the free charge number on the selection icon 88 on the charge operation screen 102. The mobile terminal device 10 displays the number of printable sheets to be purchased (hereinafter sometimes referred to as the number of sheets to be charged) and the purchase price of the number of sheets to be charged in a line, on the selection icons 88 and 89 on the charge operation screen 102. In the normal charge process, the mobile terminal device 10 displays, for example, a different number of charges and fee on each of the plurality of selection icons 88 and 89. The user selects the selection icon 88 or 89 corresponding to the number of charge sheets to be purchased, from among a plurality of selection icons 88 and 89.

When one of the selection icons 88 and 89 is selected, the mobile terminal device 10 displays the charge operation screen 103 (S112). The mobile terminal device 10 displays the first input field 105, the second input field 106 and a decision button 107 on the charge operation screen 103. The mobile terminal device 10 receives input of the user's e-mail address in the first input field 105. This e-mail address is, for example, an e-mail address for notifying that the fee collection is executed according to the execution of charging. Further, the mobile terminal device 10 receives the payment method for the charge fee in the second input field 106. The payment method is not particularly limited, but a credit card, a convenience store payment, a bank account, an electronic money, or the like may be used. It should be noted that the collection of fees in the present disclosure means, for example, that the credit card company charges and receives payment for the credit card received in the second input field 106, that the convenience store receives the payment of the fee by the convenience store payment method, that a bank debits money from bank account, or the like.

When the decision button 107 is selected, the mobile terminal device 10 determines whether the contents received in the first input field 105 and the second input field 106 are correct, and if correct, transmits a charge instruction to the server 30 (see S43 in FIG. 8). Therefore, the mobile terminal device 10 does not receive information on an e-mail address and a payment method that are required in the normal charge process in the above-described tutorial process. Thus, it is possible to omit the operation of receiving unnecessary information in the tutorial process, and notifying a guidance to the user about the charge operation in a simple and easy-to-understand manner. It should be noted that the mobile terminal device 10 may display a screen for receiving an e-mail address and a payment method in the same manner as the charge operation screen 103 and guide how to input the e-mail address, in the tutorial process.

In S43, the mobile terminal device 10 transmits to the server 30 the device ID of the printer 20 selected in S41, the number of charges received on the charge operation screen 102, and the information on the e-mail address and payment method received on the charge operation screen 103. When the charge instruction of S43 is acquired, the server 30 checks the payment method and the like (S45). The server 30 executes, for example, user authentication using the e-mail address received in S43, a process of checking the payment method with the server of the credit card company or bank, and the like. It should be noted that the server 30 may execute a check process with a credit card company or the like, after completion of synchronization process (S47 to S51) for the number of printable sheets, which will be described later. Further, once the e-mail address and payment method are registered, the server 30 may use the registered e-mail address and payment method in subsequent normal charge process. In this case, the mobile terminal device 10 may display registered information in the first input field 105 and the second input field 106 on the charge operation screen 103 and receive changes.

After executing S45, the server 30 transmits an addition instruction for adding the charge number acquired from the mobile terminal device 10, to the printer 20 with the device ID acquired from the mobile terminal device 10 (S47). When the addition instruction of S47 is acquired, the printer 20 adds the charge number to the number of printable sheets in the printer management table PT (S49). After adding the charge number to the number of printable sheets, the printer 20 transmits to the server 30, the number of printable sheets after addition, that is, the current number of printable sheets in the printer management table PT (S51).

When the number of printable sheets is acquired in S51, the server 30 updates the information in the server management table ST associated with the printer 20 of the transmission source, that is, the printer 20 to be charged (S53). The server 30 overwrites the number of printable sheets of the target printer 20 with the number of printable sheets acquired in S51 (S53). Thus, the number of printable sheets in the printer management table PT and the number of printable sheets in the server management table ST may be synchronized. Further, the server 30 determines that the payment of fee has been completed when the number of printable sheets has been charged, and uses the payment method acquired in S43 to collect the fee corresponding to the charge number (S53). The payment in the present disclosure means, for example, a procedure for a sales contract for the number of printable sheets via the mobile terminal device 10. As described above, the server 30 makes a sales contract for the number of charging sheets through the operation of the mobile terminal device 10. The server 30 collects the fee, when the sales contract (settlement process) is completed. For example, in response to the payment of the fee, the server 30 transmits a notification of requesting the credit card company, bank, or the like designated in the payment method to collect the fee. When the credit card company or the like completes the collection of fees from the notified payment method (credit card number, or the like), it notifies the server 30 that the collection of fees has been completed. When the server 30 acquires the notification that the collection of fees has been completed, the server 30 transmits to the e-mail address acquired in S43 that the payment has been completed.

It should be noted that the payment in the present disclosure may not include the processes up to the completion of charging. For example, the server 30 may determine that the payment has been completed when the charge instruction of S43 is received from the mobile terminal device 10. In this case, the server 30 may notify the credit card company or the like of the fee collection, before executing the synchronization process (S47 to S51) for the number of printable sheets. Alternatively, the server 30 may execute processes from the fee settlement process to the collection process (withdrawal, or the like), instead of the credit card company, bank, or the like performing the fee collection. Further, the server 30 may not collect the fee (notify the credit card company, or the like) immediately after the settlement process is completed. In this case, the server 30 may transmit to the e-mail address received in the first input field 105 a notification that the payment of fee has been completed. Therefore, the e-mail address received in the first input field 105 may be used not as a contact destination for charge collection, but as a contact destination for payment completion.

After executing S53, the server 30 transmits to the mobile terminal device 10 a completion notification indicating that the charging has been completed (S55). The server 30 transmits the number of printable sheets updated in S53 to the mobile terminal device 10, in the completion notification of S55. When the completion notification of S55 is acquired, the mobile terminal device 10 overwrites the number of printable sheets 18C with the number of printable sheets obtained from the server 30 (S57). Thereby, the number of printable sheets in the mobile terminal device 10, the printer 20, and the server 30 may be synchronized.

As shown in FIG. 9, when the decision button 107 is selected on the charge operation screen 103, the mobile terminal device 10 displays the charge operation screen 104 (S113). The mobile terminal device 10 displays the message 81, the number information 82, and the charge button 83 on the charge operation screen 104 in the same manner as the charge operation screen 101. Further, the mobile terminal device 10 displays the number of printable sheets 18C after charging in the number information 82. Thereby, charging may be executed according to the payment of fee.

In the first embodiment described above, the printing system 1 is an example of a recording system. The mobile terminal device 10 is an example of an information processing device. The touch panel 14 is an example of an input interface and a display unit. The application 18B is an example of a program. The printer 20 is an example of a recording device. The printing unit 25 is an example of a recording unit. The printer storage unit 26B is an example of a recording device recording unit. The charge operation screen 103 is an example of a payment method input screen. A one-time token is an example of identification information. S101 to S108 are an example of the tutorial process. S111 to S113 are an example of the charge process. S53 is an example of the settlement process. S25 and S27 are an example of the addition process. S13 is an example of the start instruction transmission process. S15 is an example of the execution determination process. S17 is an example of the response process. S19 is an example of the purchase reception process. S21 is an example of the execution instruction transmission process. S31 is an example of the setting process.

According to the above-described first embodiment, the following advantages are achieved.

(1) The printer 20 of the first embodiment includes the printing unit 25 that performs printing operations on paper, and performs printing operations by the printing unit 25 within the range of the number of printable sheets (an example of the recording permission amount in the present disclosure). The mobile terminal device 10 displays, on a touch panel 14, tutorial operation screens 71 to 79 for notifying a guidance to the user about a charge operation for purchasing the number of printable sheets, which are operations on the touch panel 14 (S101 to S108 in FIG. 7). According to this, by notifying a guidance to the user about the tutorial operation while displaying the tutorial operation screens 71 to 79, it is possible to guide the user for the charge operation more specifically. The user may understand the charge operation procedure, which button to operate, or the like, by operating the tutorial operation screens 71 to 79, and may learn the operation method until purchasing the number of printable sheets. As a result, it is possible to reduce the user's anxiety about the charge operation and promote the purchase of the number of printable sheets.

(2) The mobile terminal device 10 executes a process (S111 to S113) for displaying, on the touch panel 14, charge operation screens 101 to 104 for receiving the purchase of the number of printable sheets. According to this, in one mobile terminal device 10, after receiving a tutorial of a charge operation, the actual charge operation may be performed on the charge operation screens 101 to 104 to execute charge.

(3) The mobile terminal device 10 starts the charge process of S111 to S113 or the tutorial process of S101 to S108, in accordance with an operation input to the touch panel 14. According to this, it is possible to start the actual charge process or the tutorial process of notifying a guidance to the user about the charge operation, in accordance with the content of the operation input to the touch panel 14. If the user does not need the tutorial and wants to perform charging immediately, the user may start the charge process. Further, since charging is performed for the first time, and the user wants to receive the tutorial, the user may receive the tutorial by performing an operation to start the tutorial process.

(4) In the charge process, the mobile terminal device 10 receives an instruction to purchase the number of printable sheets on the charge operation screens 101 to 104 based on the operation input to the touch panel 14, and executes a process of increasing the number of printable sheets of the printer 20, based on the number of printable sheets for which the purchase instruction is received. According to this, the mobile terminal device 10 may execute a charge process for the printer 20 and increase the number of printable sheets, by receiving the charge operation on the charge operation screens 101 to 104. The user may select and charge the number of sheets, by selecting desired selection icon 88 or 89 on the charge operation screen 102, for example.

(5) In the tutorial process, the mobile terminal device 10 switches the tutorial operation screen 73 to the tutorial operation screen 74 so as to limit the charge operation on the selection icon 89 for which the number of printable sheets is purchased on the tutorial operation screen 73. According to this, in the tutorial process, it is possible to reduce the occurrence of an erroneous operation of purchasing the number of printable sheets by mistake. The user may perform the simulated charge operation with more peace of mind.

(6) In the tutorial process, the mobile terminal device 10 displays the charge operation screen 102 in the charge process on the touch panel 14, as the tutorial operation screen 73, and switches between the tutorial operation screens 73 and 74 to limit the charge operation on the charge operation screen 102. According to this, by displaying the actual charge operation screen 102 as the tutorial operation screen 73, the user may be taught in an environment closer to the actual charge operation.

(7) When the charge process shown in FIG. 9 is executed, the printing system 1 pays a fee corresponding to the purchased number of printable sheets (S53). Further, the printing system 1 does not execute the settlement process of S53, when the tutorial process shown in FIG. 7 is executed. According to this, the user may execute the tutorial process and learn the charge operation without worrying about the payment of the fee. Further, since no fee is required, the user may receive the tutorial, without selecting or registering a payment method, such as registering a credit card for paying the fee for the number of printable sheets to be purchased.

(8) The printing system 1 includes a plurality of printers 20. The mobile terminal device 10 executes the tutorial process, in a state where any printer 20 is selected (in a state where the printer is selected on the printer display portion 61). When the printing system 1 executes the tutorial process for the first time (first) for the printer 20 selected in the tutorial process, the printing system 1 adds a predetermined free charge number to the number of printable sheets of the selected printer 20 without paying the fee (S25, S27). When the tutorial process from the second time onwards is executed for the selected printer 20, the printing system 1 does not execute free charging of S25 even when the tutorial process is executed in the mobile terminal device 10. According to this, it is possible to provide the user with the free charge number as a service, in accordance with the execution of the tutorial process for the first time. This may make the user more willing to receive tutorials. Further, from the second time onwards, by not executing the free charging, it is possible to reduce the execution of the tutorial for the number of printable sheets.

(9) The server 30 includes a server storage unit 32B. In the server storage unit 32B, the device ID of the printer 20 and an execution flag (an example of free charge execution information in the present disclosure) indicating whether or not the printer 20 indicated by the device ID has been charged for free are stored in association with each other. The mobile terminal device 10 transmits a start instruction to the server 30 in response to the start of the tutorial process (S13). The server 30 determines the execution flag for the printer 20 selected in the tutorial process, based on the acquisition of the start instruction (S15). When it is determined that free charging is not executed as a result of the determination process in S15, the server 30 adds the free charge number to the selected printer 20 as a target (S25, S27). Further, the server 30 does not execute the free charging when the free charging has been executed. According to this, the server 30 may determine whether or not the free charging has been executed for each printer 20 based on the execution flag. The server 30 may charge the printer 20 selected in the tutorial process for free, in accordance with the execution of the tutorial process for the first time.

(10) When it is determined that the free charge number is not been added, as a result of the determination process in S15, the server 30 responds to the mobile terminal device 10 with a one-time token that identifies the mobile terminal device 10 of the transmission source and a predetermined free charge number (S17). Further, when the free charging has been completed, the server 30 responds to the mobile terminal device 10 with a one-time token and information indicating that the free charge number is zero (S17 in the tutorial processes from the second time onwards). When a predetermined (non-zero) free charge number is acquired in S17, the mobile terminal device 10 displays the free charge number as the charge number to be added on the tutorial operation screen 74 in the tutorial process. When the information indicating that the free charge number is zero is acquired, displays a fact that the charge number to be added is zero, on the tutorial operation screen 77, and receives an operation to purchase the charge number (S19). When receiving the operation to purchase the charge number in S19, the mobile terminal device 10 transmits to the server 30 the one-time token acquired in S17 and an execution instruction to add the free charge number (S21). When the execution instruction is acquired from the mobile terminal device 10, and it is determined that the free charge number returned in S17 is not zero, based on the one-time token acquired in S21, the server 30 executes free charging (S23, S25).

According to this, when the free charging has been completed, the user may be made to recognize through the tutorial operation screen 77 that the free charge number is zero or that the free charging has already been executed. When the user may recognize that another user has executed free charging, the user may determine not to execute unnecessary tutorial process.

(11) The server 30 sets information indicating that the free charge number is added to the execution flag associated with the printer 20 for which the free charge number is added in S25, in the server storage unit 32B, based on the execution of the free charge in S25 and S29 (S31). According to this, the server 30 may determine whether or not the free charging has been completed, for the printer 20 associated with the execution flag, by updating the execution flag, in accordance with the execution of the free charging.

(12) The application 18B displays on the touch panel 14, the charge operation screen 103 (an example of the payment method input screen in the present disclosure) for purchasing the number of printable sheets and for inputting a payment method for paying a fee corresponding to the purchase of the number of printable sheets (S112). Further, the application 18B notifies a guidance to the user about the charge operation without displaying the charge operation screen 103 in the tutorial process of FIG. 7. According to this, the user is not required to enter a contact destination such as a payment method or an e-mail address. In other words, the user may receive the tutorial without registering a payment method or the like, and may receive the tutorial more easily.

(13) The application 18B starts the tutorial process of FIG. 7, in a state where any printer 20 is selected on the printer display portion 61. In the printer 20, when the tutorial process is executed for the first time while the printer 20 is selected in the tutorial process, a predetermined free charge number is added to the number of printable sheets of the printer 20 without paying the fee, but when the tutorial process is executed from the second time onwards while the printer 20 is selected, the free charge number is not be added even when the tutorial process is executed. The application 18B does not display the free charge number in the charge process, but displays the free charge number in the tutorial operation screens 73 and 74 of the tutorial process. According to this, it is possible to reduce the occurrence of erroneous operations by the user by not displaying the free charge number in the charge process but displaying the free charge number in the tutorial process. Further, free charging may be executed only when the tutorial process for the first time is performed.

(14) In the tutorial process from the second time onwards for the selected printer 20, the application 18B displays a message 93 indicating that the free charge number is not added even if the operation to purchase the number of printable sheets is executed on the touch panel 14, on the tutorial operation screen 78. According to this, it is possible to make the user more certainly recognize that the free charging has been completed and that the free charge number is not added.

Next, a second embodiment in the present disclosure will be described. In the first embodiment described above, the server 30 manages the execution flag of each of the printers 20 of the printing system 1. On the other hand, the second embodiment differs from the first embodiment in that the printer 20 manages its own execution flag. In the following description, the same reference numerals are given to the same processes as in the above-described first embodiment, and the description thereof will be omitted as appropriate.

Figure 10:
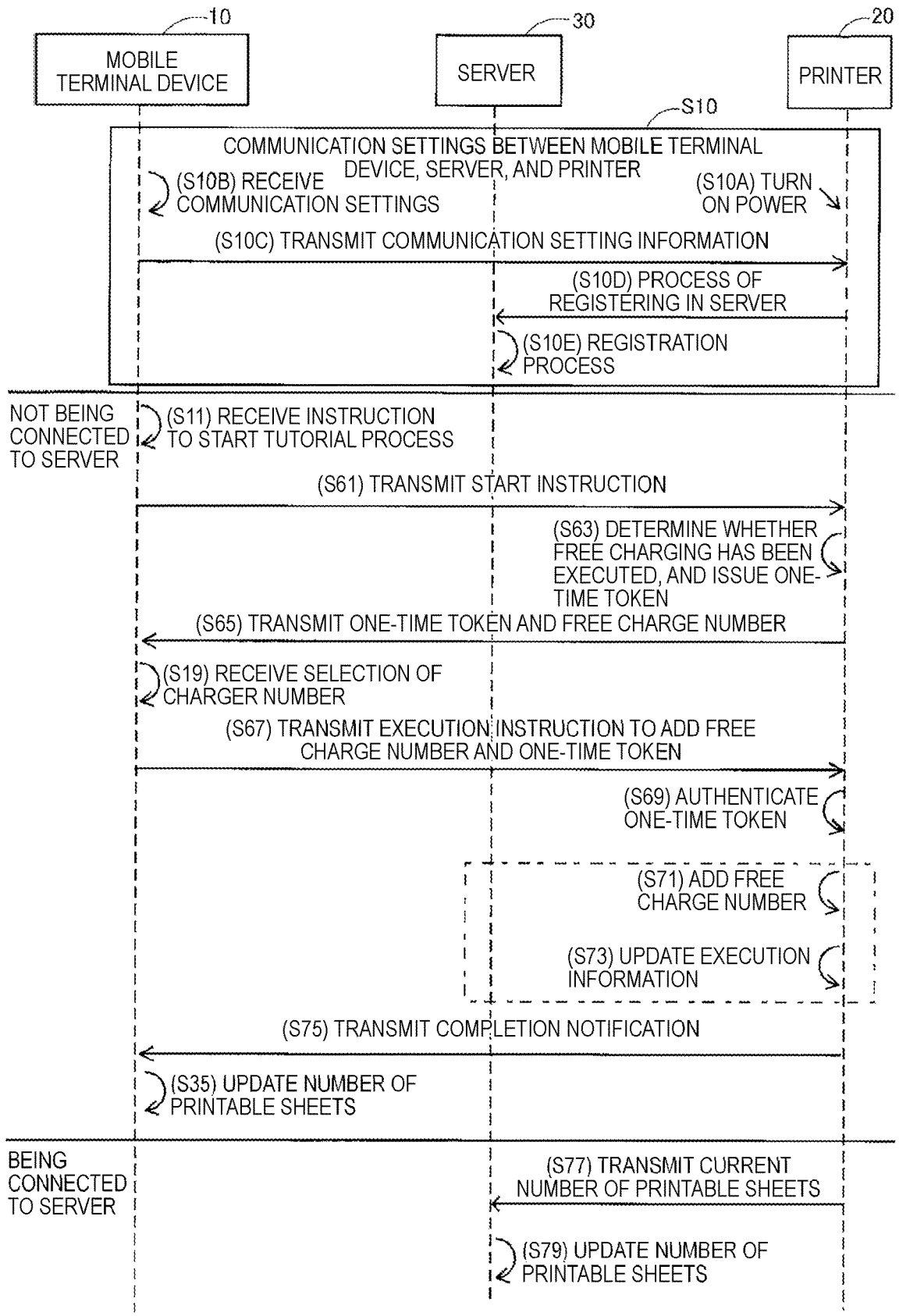
FIG. 10 is a sequence diagram when a tutorial process is executed according to a second embodiment.

FIG. 10 shows the user's work and the contents of each device's process in the tutorial process in the second embodiment. First, a case will be described in which the tutorial process for the first time is executed for any printer 20, in a state where the any printer 20 is selected by the application 18B. Further, a case of setting the printer 20 with the device ID "dv1" (see FIGS. 11 and 12) as the printer 20 will be described. The user operates, for example, the mobile terminal device 10 and the printer 20 to perform communication settings and the like in S10. In the second embodiment, as will be described later, it is possible to guide the user for the charge operation only via communication between the mobile terminal device 10 and the printer 20, that is, even in a state in which connection with the server 30 is not possible. Therefore, as a premise for starting a process from S11 onwards, the communication setting process of S10 is not essential. In the following description, it is assumed that the printer 20 is not connected to the server 30 in the tutorial process of S11 to S35 as shown in FIG. 10, for example. Further, the mobile terminal device 10 may execute communication with the printer 20 after S11 by communication via the external communication unit 16 and the router 2, or by short-range wireless communication via the short-range communication unit 13.

When the application 18B is activated while the mobile terminal device 10 is communication with the printer 20, the mobile terminal device 10 receives an instruction to start the tutorial process (S11). As in FIG. 5 of the first embodiment, the mobile terminal device 10 displays a message 65 indicating that free charging is possible on the charge icon 56, and displays the tutorial operation screens 71 and 72 shown in FIG. 7, in accordance with the operation on the charge icon 56. When the charge button 83 is operated on the tutorial operation screen 72, the mobile terminal device 10 transmits a start instruction to the printer 20 (S61).

When the printer 20 acquires the start instruction in S61, the printer 20 determines whether or not the free charge has been executed, based on the execution flag (S63). FIGS. 11 and 12 show the printer management table PT and server management table ST of the second embodiment. As shown in FIG. 11, execution flag information is set in the printer management table PT of the second embodiment. Further, as shown in FIG. 12, the information on the execution flag is not stored in the server management table ST of the second embodiment. When the printer 20 is shipped from the vendor or the like, a value "x" indicating that the free charging has not been executed is set in the execution flag of the printer management table PT of the printer 20, and when the free charging for the first time is executed, a value "o" indicating execution completion is set. The server 30 may manage the execution flag of the printer management table PT of each printer 20 in the server management table ST in association with the device ID as in the first embodiment. Further, the first embodiment and the second embodiment may be combined. That is, the printing system 1 may include both the printer 20 that determines free charging based on the execution flag of the server 30 and the printer 20 that determines free charging based on the execution flag of the printer 20.

The printer 20 determines in S63 whether or not the execution flag in the printer management table PT indicates execution completion. The printer 20 sets a predetermined number of sheets (for example, 2000 sheets) as the free charge number, when the execution flag is set to a value indicating unexecuted "x". The printer 20 issues a one-time token and temporarily stores the issued one-time token and the value of the free charge number in the printer storage unit 26B. The printer 20 transmits the one-time token and information on the free charge number associated in S63, to the mobile terminal device 10 (S65).

As in the first embodiment, when the charge button 83 on the tutorial operation screen 72 in FIG. 7 is operated, the mobile terminal device 10 temporarily displays the tutorial operation screen 73 and then displays the tutorial operation screen 74. For example, the mobile terminal device 10 displays the tutorial operation screen 74, and when receiving the information of S65, enables the operation on the selection icon 88 (S19). When receiving an operation on the selection icon 88 on the tutorial operation screen 74, the mobile terminal device 10 transmits an execution instruction to add the free charge number and the one-time token acquired in S65 to the printer 20 (S67).

When the printer 20 acquires the execution instruction of S67, the printer 20 executes authentication based on the one-time token acquired in S67 and the one-time token stored in the printer storage unit 26B in S63 (S69). For example, when the two one-time token values match, the printer 20 determines that the authentication has succeeded (S69). Further, when the two one-time tokens do not match, the printer 20 may notify the mobile terminal device 10 of an error. This makes it possible to determine whether or not the mobile terminal device 10 that has transmitted the free charge number in S65 is the same as the mobile terminal device 10 that has acquired the execution instruction in S67. Note that the printer 20 may compare the hash values of the two one-time tokens, or the like, without determining whether the one-time tokens match in the authentication process of S69.

When the one-time token authentication in S69 succeeds, the printer 20 adds the free charge number stored in the printer storage unit 26B in S63 to the number of printable sheets in the printer management table PT of the printer 20 (S71). Since this time is the tutorial process for the first time, 2000 sheets of the free charge number are added. Further, the printer 20 updates the execution flag in the printer management table PT to data indicating execution completion (S73).

After updating the number of printable sheets and the execution flag in the printer management table PT, the printer 20 transmits a completion notification to the mobile terminal device 10 (S75). The printer 20 transmits the number of printable sheets updated in S73 to the mobile terminal device 10, in the completion notification of S75. When the completion notification of S75 is acquired, the mobile terminal device 10 updates the number of printable sheets 18C with the number of printable sheets acquired from the printer 20 (S35). As in the first embodiment, when the selection icon 88 is selected on the tutorial operation screen 74 shown in FIG. 7, the mobile terminal device 10 displays the tutorial operation screen 75, and displays the number of printable sheets after free charging acquired from the printer 20 (for example, 2000 sheets) in the number information 82 of the tutorial operation screen 75. Thus, even when the execution flag is managed by the printer 20, it is possible to notify a guidance to the user about the charge operation and execute charging for the free charge number.

As shown in FIG. 10, when the printer 20 is connected to the server 30 via the Internet 3 and becomes communicable after the tutorial process is completed, the printer 20 may execute synchronization of the number of printable sheets with the server 30. The printer 20 transmits the number of printable sheets in the printer management table PT, that is, the number of printable sheets after free charging to the server 30 (S77). When the number of printable sheets is acquired in S77, the server 30 updates the number of printable sheets associated with the printer 20 of the transmission source, that is, the printer 20 for which free charging has ended, with the acquired number of printable sheets, in the server management table ST (S79). Thereby, the number of printable sheets in the mobile terminal device 10, the printer 20, and the server 30 may be synchronized. As described above, the tutorial process of the second embodiment does not require the process of the server 30. Therefore, the recording system in the present disclosure may be configured without a server.

Next, a case where the tutorial process from the second time onwards is executed will be described. In the following description, the description of the same contents as in the tutorial process for the first time described above will be omitted as appropriate. In the tutorial process from the second time onwards, as in the first embodiment, when the printer 20 determines that the free charging has been completed, based on the execution flag in the printer management table PT (S63), the printer 20 transmits information indicating that the free charge number is zero to the mobile terminal device 10 (S65). The mobile terminal device 10 displays zero as the number of printable sheets of the selection icon 88 on the tutorial operation screens 76 and 77 shown in FIG. 7 (S19).

When the printer 20 acquires the execution instruction in S67, the printer 20 does not execute the addition process (S71) or the update process (S73) of the printer management table PT, indicated by the dashed line in FIG. 10, that is, does not execute free charging. As in the first embodiment, when the completion notification of S75 is acquired, the mobile terminal device 10 updates the display on the touch panel 14 (the tutorial operation screens 77, 79) as in the first embodiment, without executing the update process of S35. With this, it is possible to guide the user for the charge operation from the second time onwards. Note that the content of the tutorial process described above is an example. For example, in the above-described tutorial process from the second time onwards, the addition process of the printer 20 or the like is not required. Therefore, after acquiring the information indicating that the free charge number is zero in S65, the mobile terminal device 10 may transition only the tutorial operation screen without executing communication with the printer 20.

In the second embodiment described above, the one-time token is an example of identification information. S61 is an example of a start instruction transmission process. S63 is an example of the execution determination process. S71 is an example of the addition process. S65 is an example of the response process. S19 is an example of the purchase reception process. S67 is an example of the execution instruction transmission process. S73 is an example of the setting process.

According to the above-described second embodiment, the advantages similar to those of in the first embodiment are achieved. Further, in the second embodiment, the following advantages are achieved.

(1) The printer storage unit 26B stores an execution flag (an example of free charge execution information in the present disclosure) indicating whether or not the free charge number has been added to the number of printable sheets of the printer (FIG. 11). When the tutorial process starts, the mobile terminal device 10 transmits a start instruction to the printer 20 selected in the tutorial process (S61). The printer 20 determines the execution flag, based on the acquisition of the start instruction (S63). When it is determined that free charging is not executed as a result of the determination process in S63, the mobile terminal device 10 adds the free charge number to the number of printable pages in the printer management table PT of the mobile terminal device 10 (S71). Further, when it is determined that the free charge number has been added as a result of the determination process in S63, the printer 20 does not execute the free charging in S71. According to this, the printer 20 may provide the user with the free charge number as a service in accordance with the execution of the tutorial process for the first time. This may make the user more willing to receive tutorials. Further, from the second time onwards, by not executing the free charging, it is possible to reduce the execution of the tutorial for the number of printable sheets.

(2) When it is determined that the free charging is not executed as a result of the determination process in S63, the printer 20 responds to the mobile terminal device 10 with the one-time token and the free charge number (S65). Further, when the free charging has been completed, the printer 20 responds with a one-time token and information indicating that the free charge number is zero (S65). When a predetermined (non-zero) free charge number is acquired, the mobile terminal device 10 displays the free charge number on the tutorial operation screen 74 as the additional number of printable sheets, and when information indicating that the free charge number is zero is acquired, the mobile terminal device 10 displays on the tutorial operation screen 77 that the free charge number is zero, and receives an operation to purchase the charge number (S19). When receiving the purchase operation, the mobile terminal device 10 transmits, to the printer 20, the one-time token acquired in S65 and an execution instruction to add the free charge number (S67). When the execution instruction is acquired, in case where the one-time token acquired in S67 matches the one-time token responded in S65, and it is determined that the free charging is not executed, based on the execution flag, the printer 20 executes free charging.

According to this, the printer 20 may execute authentication using the one-time token and execute free charging based on the execution flag. Further, when the free charging has been completed, the user may be made to recognize through the tutorial operation screen 77 that the free charge number is zero or that the free charging has already been executed.

(3) The printer 20 sets information indicating that the free charging has been executed in the execution flag, based on the execution of the process of S71 (S73). According to this, the printer 20 may determine whether or not the free charging has been completed for the printer 20, by updating the execution flag, in accordance with the execution of the free charging.

As described above, specific examples in the present disclosure have been described in detail in each of the above-described embodiments, but these are merely examples and do not limit the scope of the claims. The techniques described in the claims include various modifications and changes of the specific examples illustrated above.

For example, in each of the embodiments described above, the number of printable sheets is stored in the printer management table PT or the like, and the number of printable sheets is subtracted for each printing to determine whether printing is permitted. On the other hand, the number of printable sheets may be managed using an amount that increases due to printing, such as the number of printed sheets which is printed by the printer 20. In this case, the number of printable sheets may be managed by, for example, subtracting the number of printed sheets from the total number of charged sheets.

Further, the printing system 1 is a system that records the device ID and the number of printable sheets in association with each other in the server management table ST, and manages the number of printable sheets for each printer 20, but the present invention is not limited to this. The printing system 1 may be, for example, a system that manages the number of printable sheets in association with the user ID. As the user ID herein, the ID of the user registered in the application 18B, the ID of the user using the mobile terminal device 10, or the like may be used. Further, although the printing system 1 is configured to include the server 30, it may be configured not to include the server 30. For example, a tutorial for charging may be executed in a system in which the mobile terminal device 10 and the printer 20 communicate with each other. Therefore, the recording system in the present disclosure may be configured without a server. Further, the recording system may be configured so as not to transmit a notification to the server 30 or the printer 20 according to the tutorial and not to execute free charging. That is, the recording system may be configured to execute only the tutorial on the mobile terminal device 10.

Further, the printing system 1 may have a configuration including only one mobile terminal device 10 and one printer 20. Further, the printing system 1 may have a configuration including one mobile terminal device 10 and a plurality of printers 20, or a configuration including a plurality of mobile terminal devices 10 and one printer 20.

Further, the mobile terminal device 10 may separately include an application 18B for executing the tutorial process and an application 18B for executing the charge process. Therefore, the mobile terminal device 10 may be configured to be able to execute only one of the tutorial process and the charge process.

Further, in the tutorial process, the mobile terminal device 10 displays the tutorial operation screen 73 that is the same as the charge operation screen 102, but the tutorial operation screen 73 may not be displayed. The charge operation screens 101 to 104 and the tutorial operation screens 71 to 79 may have different screen configurations. Further, although the mobile terminal device 10 switches between the tutorial operation screens 71 to 79 according to the user's operation input, all screens may be switched automatically.

Further, the printing system 1 gives the free charge number only in the tutorial process for the first time, but may give the free charge number up to, for example, a predetermined number of times, from the second time onwards. Further, in the charge process of FIG. 9, by selecting a desired selection icon 88 or 89 on the tutorial operation screen 73 displayed on the touch panel 14, the number of sheets to be charged corresponding to the selected selection icon 88 or 89 is charged to the number of printable sheets. However, the configuration may be such that the user may input a desired charge number, the number of printable sheets is charged with the charge number input by the user, and the vendor bills the user for the billing amount corresponding to the input charge number. In this case, for example, in the tutorial process, the mobile terminal device 10 may set the free charge number in the charge number input field, and control such that the charge number may not be changed.

Further, although the mobile terminal device 10, which is a smart phone, is used as the information processing terminal in the present disclosure, the present invention is not limited to this. Terminals such as a desktop PC, a notebook PC, and a tablet PC may be used as the information processing device.

Further, in each of the above-described embodiments, the tutorial process for the first time and the tutorial process from the second time onwards when one mobile terminal device 10 is operated have been described, but the processes may be similarly executed for a plurality of mobile terminal devices 10. For example, when executing the tutorial process for the first time for any printer 20, free charging is executed regardless of which one of the plurality of mobile terminal devices 10 is operated. Further, when executing the tutorial process for the second time or later for any printer 20, free charging may not be executed regardless of which one of the plurality of mobile terminal devices 10 is operated.

The printer 20 may be configured such that the user may replenish ink (each ink tank of the tank unit 23 may be replaced). Further, examples of means for replenishing consumables such as ink include a configuration in which a bottle containing ink or the like may be injected into the tank unit 23.

Further, although the inkjet printer 20 is used as the recording device in the present disclosure, a laser printer or a thermal printer may be used. Further, the recording device is not limited to a printer for individual users, and may be a printer for commercial or industrial use. The recording device may be a multifunction peripheral having a scan function, a copy function, a FAX function, or the like in addition to the print function. Further, the recording device may be a scanner, a copier, or a facsimile machine. Further, the recording permission amount is not limited to the number of printable sheets, and may be the permitted number of scan or FAX executions. Further, the recording device may be a laser marker that marks a metal member or the like with a laser. Therefore, the recording medium in the present disclosure is not limited to paper, and may be a metal member or the like. Further, the recording permission amount is not limited to the number of printable sheets, and may be the permitted number of laser processing executions.

Further, the recording permission amount in the present disclosure is not limited to the number of printable sheets. For example, the recording permission amount may be the consumption amount of ink or toner. The recording permission amount may be an amount that permits ejection of ink for how many dots (pixels), or an amount that permits the use of ink (how many ml, or the like). Alternatively, the recording permission amount may be defined by the number of rotations of a member that rotates along with the printing operation, such as a photosensitive drum.

Further, although the printer 20 is configured to store the printer management table PT in the printer storage unit 26B, the present invention is not limited to this. For example, the printer 20 may include a reading IF capable of reading IC cards, memory cards, and the like. Then, the printer 20 may read and use the information of the printer management table PT such as the device ID and the number of printable sheets, from the IC card or the like attached to the reading IF. That is, the printer 20 may be configured to manage the printer management table PT using an IC card or the like.

Alternatively, the printer 20 may store and manage the information in the printer management table PT, such as the number of printable sheets, in a memory other than the printer storage unit 26B in which the printer program 26B1 is stored, such as the memory provided in the ink tank of the tank unit 23, or in the case of a laser printer, the memory of the toner cartridge, the memory of the photosensitive drum, or the like.

The embodiments disclosed here are illustrative in all respects and should be considered not restrictive. The technical features described in each embodiment may be combined with each other, and the scope of the present invention is intended to include all modifications within the scope of the claims and the scope of equivalents to the scope of the claims.

What is claimed is:

1. A recording system comprising:
an information processing device including an input interface and a display unit; and
a recording device including a recording unit that executes a recording operation on a recording medium, the recording device being configured to control the recording unit to execute the recording operation within a range of a recording permission amount for permitting the recording operation by the recording unit,
wherein the recording system is configured to execute a tutorial process such that, in the tutorial process, a tutorial operation screen for notifying a guidance to a user about a charge operation is displayed on the display unit of the information processing device, the charge operation being an operation on the input interface for purchasing the recording permission amount; and
the recording device includes multiple recording devices,
wherein the tutorial process is executed in a state where at least one of the recording devices is selected as a selected recording device, and
wherein the recording system is configured to execute an addition process of adding a predetermined free recording permission amount to the recording permission amount of the selected recording device without settling a fee, in a case where the tutorial process is executed for the selected recording device for a first time, and
wherein the recording system is configured to not execute the addition process in a case where the tutorial process is executed for the selected recording device for a second time or more.

2. The recording system according to claim 1,
wherein the recording system is further configured such that a charge operation screen for receiving purchase of the recording permission amount is displayed on the display unit of the information processing device.

3. The recording system according to claim 2,
wherein the recording system is further configured to start the charge process or the tutorial process in accordance with an operation input to the input interface of the information processing device.

4. The recording system according to claim 2,
wherein the recording system is further configured such that the information processing device receives, in the charge process, an instruction to purchase the recording permission amount on the charge operation screen based on the operation input to the input interface of the information processing device, and the recording system is further configured to execute a process of increasing the recording permission amount of at least one of the multiple recording devices based on the recording permission amount for which the purchase instruction is received.

5. The recording system according to claim 2,
wherein the tutorial operation screen includes multiple tutorial operation screens, and
wherein the tutorial operation screen is switched, in the tutorial process, from one of the multiple tutorial operation screens to another one of the multiple tutorial operation screens so as to limit the charge operation for purchasing the recording permission amount on the tutorial operation screen.

6. The recording system according to claim 5,
wherein, in the tutorial process, the charge operation screen is displayed on the display unit as the one of the multiple tutorial operation screens, and switched to the another one of the multiple tutorial operation screens to limit the charge operation on the charge operation screen.

7. The recording system according to claim 2,
wherein the recording system is further configured to execute, when the charge process is being executed, a settlement process of settling a fee corresponding to the purchased recording permission amount, and
wherein the recording system is further configured to not execute, when the tutorial process is being executed, the settlement process.

8. The recording system according to claim 1, further comprising:
a server including a server storage unit,
wherein the server storage unit is configured to store a device ID of the recording device and free charge execution information indicating whether or not the free recording permission amount is added for each of the recording devices in association with each other,
wherein the recording system is further configured to execute a start instruction transmission process of transmitting a start instruction to the server, in response to start of the tutorial process, and
wherein the server is configured to:
execute an execution determination process of determining the free charge execution information for the recording device selected in the tutorial process, based on acquisition of the start instruction;
execute the addition process for the selected recording device in the tutorial process, in a case where determined that the free recording permission amount is not added as a result of the execution determination process; and
not execute the addition process for the selected recording device in the tutorial process, in a case where determined that the free recording permission amount is added as a result of the execution determination process.

9. The recording system according to claim 8,
wherein the server is configured to execute a response process of responding to the information processing device with identification information for identifying the information processing device of a transmission source and the free recording permission amount, in a case where determined that the free recording permission amount is not added as a result of the execution determination process, and responding to the information processing device with the identification information and information indicating that the free recording permission amount is zero, in a case where determined that the free recording permission amount is added as a result of the execution determination process,
wherein the information processing device is configured to execute a purchase reception process of:
  displaying, in a case where the free recording permission amount is acquired in the response process, the free recording permission amount as the recording permission amount to be added on the tutorial operation screen in the tutorial process; and
  displaying, in a case where the information indicating that the free recording permission amount is zero is acquired in the response process, on the tutorial operation screen that the recording permission amount to be added is zero, and receiving an operation to purchase the recording permission amount, in the tutorial process; and
an execution instruction transmission process for transmitting, to the server, the identification information acquired in the response process and an execution instruction for executing the addition of the free recording permission amount, in a case where a purchase operation is received in the purchase reception process, and
wherein the server is configured to execute the addition process, in a case where the execution instruction is acquired from the information processing device and determined that the free recording permission amount responded in the response process is not zero, based on the identification information acquired in the execution instruction transmission process.

10. The recording system according to claim 8,
wherein the server is configured to execute a setting process of setting information indicating that the free recording permission amount is added to the free charge execution information associated with the recording device for which the free recording permission amount is added in the addition process, in the server storage unit, based on the execution of the addition process.

11. The recording system according to claim 1,
wherein the recording device includes a recording device recording unit that records the recording permission amount,
wherein the recording device recording unit is configured to store free charge execution information indicating whether or not the free recording permission amount is added to the recording permission amount of the own device,
wherein the recording system is further configured to execute a start instruction transmission process of transmitting a start instruction to the selected recording device, in response to start of the tutorial process, and wherein the recording device is configured to:
  execute an execution determination process of determining the free charge execution information based on acquisition of the start instruction;
  execute the addition process of adding the free recording permission amount to the recording permission amount stored in the recording unit, in a case where determined that the free recording permission amount is not added as a result of the execution determination process, and
  not execute the addition process, in a case where determined that the free recording permission amount is added as a result of the execution determination process.

12. The recording system according to claim 11,
wherein the recording device is configured to execute a response process of responding to the information processing device with identification information for identifying the information processing device of a transmission source and the free recording permission amount, in a case where determined that the free recording permission amount is not added as a result of the execution determination process, and responding to the information processing device with the identification information and information indicating that the free recording permission amount is zero, in a case where determined that the free recording permission amount is added as a result of the execution determination process,
wherein the information processing device is configured to execute:
  a purchase reception process of displaying the free recording permission amount as the recording permission amount to be added on the tutorial operation screen, in the tutorial process, in a case where the free recording permission amount is acquired in the response process, and displaying on the tutorial operation screen that the recording permission amount to be added is zero, and receiving an operation to purchase the recording permission amount, in the tutorial process, in a case where the information indicating that the free recording permission amount is zero is acquired in the response process; and
  an execution instruction transmission process for transmitting, to the recording device, the identification information acquired in the response process and an execution instruction for executing the addition of the free recording permission amount, in a case where a purchase operation is received in the purchase reception process, and
wherein the recording device is configured to execute the additional process, in a case where the execution instruction is acquired from the information processing device and where determined that the free recording permission amount is not added, based on the free charge execution information while the identification information acquired in the execution instruction transmission process and the identification information responded in the response process match.

13. The recording system according to claim 11,
wherein the recording device is configured to execute a setting process of setting information indicating that the free recording permission amount is added, in the free charge execution information, based on execution of the addition process.

14. A non-transitory computer-readable medium storing a program for an information processing device capable of communicating with a recording device, wherein the information processing device includes an input interface, and a display unit, wherein the recording device includes a recording unit that executes a recording operation on a recording medium and executes a recording operation by the recording unit within a range of a recording permission amount for permitting the recording operation by the recording unit, and wherein the program cases the information processing device to execute a process comprising:

executing a tutorial process of displaying on the display unit, a tutorial operation screen for notifying a guidance to a user about a charge operation, which is an operation on the input interface for purchasing the recording permission amount;

wherein the program cases the information processing device to execute the process further comprising:

executing a charge process of displaying on the display unit, a payment method input screen for purchasing the recording permission amount and for inputting a payment method for paying a fee corresponding to purchase of the recording permission amount; and notifying a guidance to a user the charge operation without displaying the payment method input screen, in the tutorial process;

wherein the recording device includes multiple recording devices, wherein the program cases the information processing device to execute the process further comprising:

executing the tutorial process in a state where at least one of the recording devices is selected as a selected recording device, wherein the recording device is configured to add a predetermined number of free recording permission amount to the recording permission amount of the recording device without paying a fee, in a case where the tutorial process is executed for the selected recording device for a first time, and to not add the number of free recording permission amount in a case where the tutorial process is executed for the selected recording device for a second time or more, and wherein the program cases the information processing device to execute the process further comprising:

displaying the free recording permission amount on the tutorial operation screen of the tutorial process while not displaying the free recording permission amount in the charge process.

15. The non-transitory computer-readable medium according to claim 14, wherein the program cases the information processing device to execute the process further comprising:

displaying a message on the tutorial operation screen, the message indicating that the free recording permission amount is not added even if an operation to purchase the recording permission amount is executed on the input interface, in a case where the tutorial process for the selected recording device is executed for a second time or more.

\* \* \* \* \*